United States Patent
Kuwayama et al.

(10) Patent No.: US 8,584,496 B2
(45) Date of Patent: Nov. 19, 2013

(54) DEVICE FOR PRESS-FORMING A THIN SHEET AND PRESS-FORMING METHOD

(75) Inventors: Takuya Kuwayama, Tokyo (JP); Noriyuki Suzuki, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 504 days.

(21) Appl. No.: 12/451,324

(22) PCT Filed: May 9, 2008

(86) PCT No.: PCT/JP2008/058982
§ 371 (c)(1),
(2), (4) Date: Nov. 5, 2009

(87) PCT Pub. No.: WO2008/140122
PCT Pub. Date: Nov. 20, 2008

(65) Prior Publication Data
US 2010/0096765 A1    Apr. 22, 2010

(30) Foreign Application Priority Data
May 9, 2007    (JP) .................................. 2007-124807

(51) Int. Cl.
*B21D 55/00*    (2006.01)

(52) U.S. Cl.
USPC ................................ 72/21.4; 72/21.1; 72/350

(58) Field of Classification Search
USPC ............. 72/20.1, 20.2, 20.3, 20.4, 21.1, 21.4, 72/31.11, 347, 348, 350, 379.2; 100/99; 700/206
See application file for complete search history.

(56) References Cited

U.S. PATENT DOCUMENTS

| | | | | |
|---|---|---|---|---|
| 4,866,429 A * | 9/1989 | Granere | ........................ | 340/680 |
| 4,918,956 A * | 4/1990 | Schoch | ......................... | 72/21.1 |
| 5,214,967 A | 6/1993 | Grogan | | |
| 5,941,110 A * | 8/1999 | Cao et al. | ........................ | 72/21.4 |
| 6,937,921 B1 * | 8/2005 | Mazumder | ..................... | 700/166 |
| 7,886,564 B2 * | 2/2011 | Suzuki et al. | ................... | 72/14.9 |
| 8,096,236 B2 * | 1/2012 | Fukami et al. | ................... | 100/99 |
| 8,234,897 B2 * | 8/2012 | Kuwayama et al. | ........... | 72/21.4 |
| 8,464,591 B2 * | 6/2013 | Kuwayama et al. | ............ | 73/799 |

FOREIGN PATENT DOCUMENTS

| | | |
|---|---|---|
| EP | 1 980 339 | 10/2008 |
| GB | 2 397 038 | 7/2004 |
| JP | 05-337554 | 12/1993 |
| JP | 2004-249365 | 9/2004 |

(Continued)

OTHER PUBLICATIONS

International Search Report dated Jun. 10, 2008 issued in corresponding PCT Application No. PCT/JP2008/058982.

(Continued)

*Primary Examiner* — Edward Tolan
(74) *Attorney, Agent, or Firm* — Kenyon & Kenyon LLP

(57) ABSTRACT

A press-forming device includes a punch and a die, as a mold to be measured, and a strain measurement means arranged within the mold and measuring a strain amount generated by press-forming. The strain measurement means is positioned at the press-direction side relative to a radius end of a die shoulder on the material flow-out side when the mold is positioned at a lower dead point of press-forming. The strain measurement means is preferably positioned within a region defined by a surface which is away from the center of curvature of a curved surface of the mold by the distance ten times R, where R is a curvature radius of the curved surface.

7 Claims, 18 Drawing Sheets

(56) References Cited

FOREIGN PATENT DOCUMENTS

| JP | 2005-161399 | | 6/2005 | | |
| JP | 2005-199336 | | 7/2005 | | |
| JP | 2006-136926 | * | 6/2006 | ............... | B21D 5/02 |
| JP | 2007-237190 | * | 9/2007 | ............. | B21D 26/02 |
| JP | 2008-272781 | * | 11/2008 | ............. | B21D 22/20 |
| SU | 640786 | * | 1/1979 | ............. | B21D 22/20 |
| SU | 896494 | * | 1/1982 | ............. | B21D 22/20 |
| SU | 896495 | * | 1/1982 | ............. | B21D 22/20 |
| WO | WO 2007080983 A1 | * | 7/2007 | | |

OTHER PUBLICATIONS

T. Kuwayama, et al., "Development of Total Forming Technologies for High Strength Steel Sheet—Development of Tool Friction Sensor-," The Proceedings of the 57$^{th}$ Japanese Joint Conference for the Technology of Plasticity, pp. 165-166 (2006).

Melan, et al., "Der Spannungszustand der durch eine Einzelkraft im Innern beanspruchten Halbscheibe," pp. 843-846 (Dec. 1932).

European Search Report dated Oct. 7, 2011, issued in corresponding European Patent Application No. 08752836.0.

* cited by examiner

DEVICE FOR PRESS-FORMING A THIN SHEET AND PRESS-FORMING METHOD

This application is a national stage application of International Application No. PCT/JP2008/058982, filed 9 May 2008, which claims priority to Japanese Application No. 2007-124807, filed 9 May 2007, which is incorporated by reference in its entirety.

TECHNICAL FIELD

The present invention relates to a device and a method for press-forming a thin sheet. More specifically, the invention relates to a device and a method for press-forming a thin sheet capable of measuring a stress or a strain (hereinafter, referred to as "a strain") generated on a curved surface of a press mold and judging the defect of a product by press-forming or the mold (such as crack or burning) based on the measured amount of strain.

BACKGROUND ART

In press-forming, when a thin sheet is press-molded by using a press mold having a curved projecting structure formed on the press mold, such as a bead or a projection having a small curvature, a defect in press-forming, such as a crack, necking (i.e., a constriction generated by the concentration of plastic deformation at a certain cross section of the thin sheet) or a wrinkle, may become problematic. Generally, such a crack, necking or wrinkle is very small, and therefore, it is very difficult to find in a manufacturing process.

Since a pressing force of a press machine or a reaction force due to deformation resistance of a workpiece to be pressed is applied to the mold at the time of press-forming, the mold may be elastically deformed. This elastic deformation is known as "mold strain". The crack, necking or wrinkle, generated when the thin sheet is press-molded by using the press mold having the curved projecting structure as described above, is greatly influenced by occurrence of mold strain.

As a device for measuring the mold strain, Japanese Unexamined Patent Publication (Kokai) No. 5-337554 discloses a device for correcting a deflection of press brake having an upper beam with a punch and a lower beam with a die, the punch and the die being configured to move relative to each other so as to bend a workpiece between the punch and the die. This device includes: an upper beam strain sensor for detecting a strain of the upper beam; a plurality of lower beam strain sensors for detecting a strain of the lower beam, the sensors being arranged along the longitudinal direction of the lower beam; a plurality of actuators for applying a pressure force to an upper mold or a lower mold, the actuators being arranged along a machining line between the lower beam and the lower mold or between the upper beam and the upper mold; and a control means configured to stop the upper beam at a certain point while the pressurization is carried out, obtain a detection output by the upper beam strain sensor and the lower beam strain sensors when the upper beam is stopped, calculate strain amounts of the upper and lower beams based on the detection output, control the actuators based on the calculation such that the strain amounts become proper values, and restart the pressurization. This device is intended to produce a product having an uniform bending angle across the entire length of the product.

On the other hand, Japanese Unexamined Patent Publication (Kokai) No. 2004-249365 discloses a press-forming device having a punch; a die; a blank-holding die; a friction measuring means arranged between the die and the blank-holding die; and a blank-holding force adjusting means. This device is intended to generate a proper friction force regardless of variable factors, such as lubricity between the mold and a workpiece or the surface characteristics of the workpiece, and then provide a good product even when the material characteristics of the workpiece and/or the environment condition is varied.

In addition, some of the applicants of this application disclosed a press-forming device having a piezoelectric element (or a mold friction sensor) positioned near a shoulder of a die, for measuring a compressive or extensional strain in the orthogonal directions, in the 57-th Journal of Conference on Technology of Plasticity, (2006), pp. 165-166. By means of information from the mold friction sensor, a springback and/or a torsion regarding the shape of a product may be predictable.

Although Japanese Unexamined Patent Publication (Kokai) No. 5-337554 discloses an invention regarding a device having a measurement function of the mold strain, it is described that the beam strain sensors are arranged merely along the longitudinal direction of the beam for the press brake. In a press-forming process using a mold having a complicated shape relative to the beam for the press brake, in order to measure the mold strain of the mold with a high degree of accuracy, it is necessary to directly measure the mold strain by using a measurement means within the mold such as the punch, the die or the blank-holding die. In this connection, the invention as disclosed in Japanese Unexamined Patent Publication (Kokai) No. 5-337554 is insufficient.

Further, in the invention of Japanese Unexamined Patent Publication (Kokai) No. 5-337554, the forming process is stopped before the forming is finished and the strain amounts of the upper and lower beams are detected while the forming process is stopped, and after that, the actuators are controlled such that the strain amounts become proper values and then the forming is restarted. However, in the press-forming, unlike the bending process of the press brake, if the press-forming is stopped during the process, friction between a workpiece and a tool becomes significantly different from the friction generated during the press-forming. Therefore, if the invention of Japanese Unexamined Patent Publication (Kokai) No. 5-337554 is applied to the press-forming, the mold strain will be different from that during the press-forming, whereby sufficient measurement accuracy cannot be obtained.

On the other hand, Japanese Unexamined Patent Publication (Kokai) No. 2004-249365 discloses a configuration having a strain measuring element sandwiched between a sheet and a blank-holding die fastened by a bolt or the like, for directly measuring friction. When a workpiece, sandwiched between the sheet and a die, is slidably moved, shear strain is generated at the strain measuring element and friction can then be measured. This configuration may be similar to the present application in using the strain measuring element. However, the measuring element of Japanese Unexamined Patent Publication (Kokai) No. 2004-249365 is used for measuring the friction by arranging a kind of structure on the blank-holding die or the die, therefore, the measuring element cannot directly measure the mold strain of the blank-holding die or the die.

In order to the mold strain with a high degree of accuracy, it is necessary to directly measure the mold strain of the punch, the die and/or the blank-holding die. In this connection, the invention disclosed in Japanese Unexamined Patent Publication (Kokai) No. 2004-249365 is insufficient. On the other hand, the invention disclosed in 57-th Journal of Conference on Technology of Plasticity, (2006), pp. 165-166, includes a friction sensor positioned near the shoulder of the die. However, since the actual mold has a complicated shape, a shoulder of some molds cannot be clearly identified. Therefore, in the actual mold, it is difficult to determine where the strain sensor should be positioned, and the determination needs trial and error.

DISCLOSURE OF THE INVENTION

It is an object of the present invention to provide a press-forming device and method with a high degree of accuracy and a wide application, capable of measuring the strain generated on the curved surface of the press mold, and judging the defect of a product by press-forming or the mold based on the measured amount of strain or strain amount.

According to the present invention, there is provided a press-forming device comprising: a punch; at least one die, as a mold to be measured, capable of moving relative to the punch, the mold being capable of forming a product having at least one curved surface; and a strain measurement means, arranged in the mold, for measuring a strain amount of the mold generated by press-forming, wherein the strain measurement means is positioned at the press-direction side relative to a radius end of a die shoulder on the material flow-out side when the mold is positioned at a lower dead point of press-forming.

Preferably, the strain measurement means is positioned within a region defined by a surface which is away from the center of curvature of a curved surface of the mold by the distance ten times R, where R is a curvature radius of the curved surface.

More preferably, the strain measurement means is positioned a region near the center of curvature relative to surfaces each intersecting with each end portion of the curved surface of the mold and inclined, away from the curved surface, by 45 degrees relative to a normal line at each end portion.

More preferably, wherein the strain measurement means is positioned away from a surface of the mold by equal to or more than 5 millimeters.

The press-forming device may further comprise a blank holding die for applying a blank-holding force to a workpiece to be processed.

A concrete example of the strain measurement means is a piezoelectric element sensor. The amount of strain measured in the invention, is caused by elastic deformation and a liner elastic theory can be applied thereto. In other words, by using a constitutive law regarding an isotropic elastic body (or Hooke's law), the strain and the stress may be converted from one to the other. Further, the amount of strain may be calculated by converting the displacement measured by a kind of meter.

The present invention also provides a press-forming method using the press-forming device according to any one of claims 1 to 6, the method comprising: judging that a product formed by the device is defective when a strain amount measured by the strain measurement means is above or below a predetermined range.

The present invention also provides a press-forming method using the press-forming device according to any one of claims 1 to 6, the method comprising: judging that the mold to be measured is defective when a strain amount measured by the strain measurement means is above or below a predetermined range.

In the invention, as shown in FIGS. 3 and 4, "a die shoulder" is indicated by a shoulder portion 22 of a die including a die face 21 (with which a workpiece 4 to be processed firstly comes into contact). Further, "a radius end of a die shoulder (R-end of a die shoulder)" is indicated by two ends 23 and 24 of a curved portion (or R-portion) of die shoulder 22. Among the two ends, an end of R-portion 23 positioned near die face 21 is referred to as "a radius end of a die shoulder on the material flow-in side". On the other hand, an end of R-portion 24 positioned on the press-direction side (indicated by an arrow) is referred to as "a radius end of a die shoulder on the material flow-out side". In other words, at the radius end of the die shoulder on the material flow-out side, the material deformed on the R-portion of the die shoulder is started to flow toward the generally vertical wall portion of the mold.

Further, "the press direction" means, as shown in FIGS. 3 and 4, the direction in which a punch 1 is moved toward a die 2 having a recessed shape, or the direction in which punch 1 presses a workpiece 4 to be processed into shapes.

According to the present invention, there is provided a press-forming device and a press-forming method with a high degree of accuracy and a wide application, in which the strain generated in a curved surface of a press mold may be measured, and the defect of a product by press-forming may be judged based on the measured strain amount.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Best mode for carrying out the invention will now be described in detail with reference to the drawings.

Figure 1:
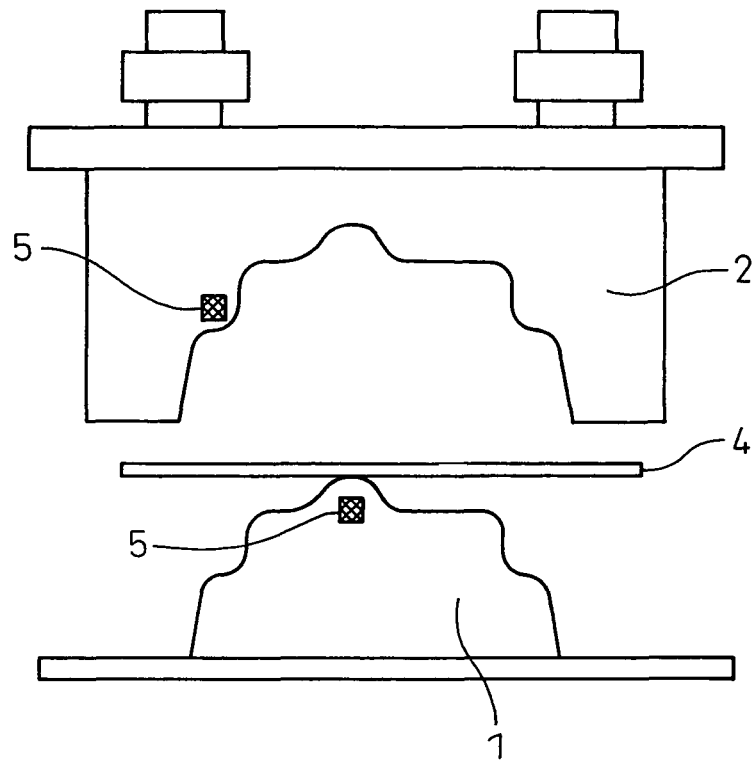
FIG. 1 is a schematic view of a press-forming device of the invention, in which a die is arranged on a slider of the device.
Figure 2:
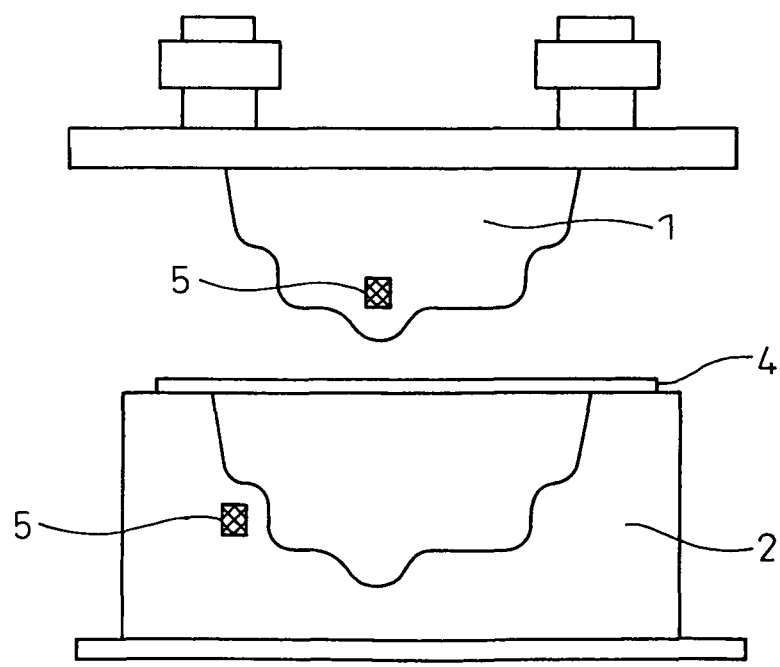
FIG. 2 is a schematic view of a press-forming device of the invention, in which a punch is arranged on a slider of the device.

FIGS. 1 and 2 are cross sectional views of a press-forming device according to a first embodiment of the invention. In FIG. 1, a die 2 is arranged on a press slide, and in FIG. 2, a punch 1 is arranged on the press slide. In the both cases, the press-forming device has punch 1 and die 2 configured to be moved relative to each other.

A workpiece 4 to be processed is compressed against punch 1 by means of die 2 and is formed into a predetermined shape. At this point, it was found that a forming defect such as a crack, necking and wrinkle, and a mold defect, such as sticking of the mold may be detected by arranging a strain measurement means 5 (as described below) in the mold around a curved convex portion formed on the surface of punch 1 or die 2 and by monitoring an amount of strain or a strain amount measured by the measurement means.

Figure 3:
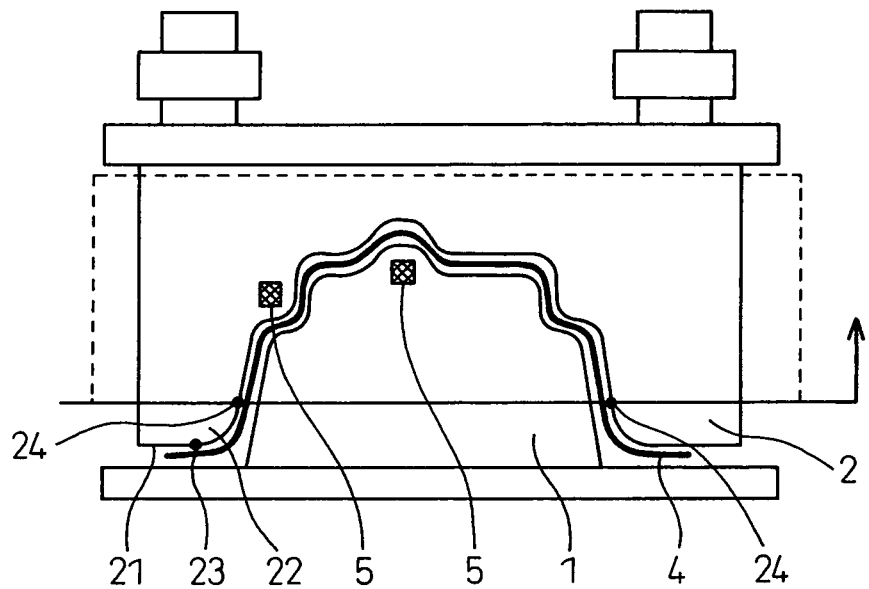
FIG. 3 is a detail view showing the device of FIG. 1, in which a mold strain measurement means is arranged in the device.
Figure 4:
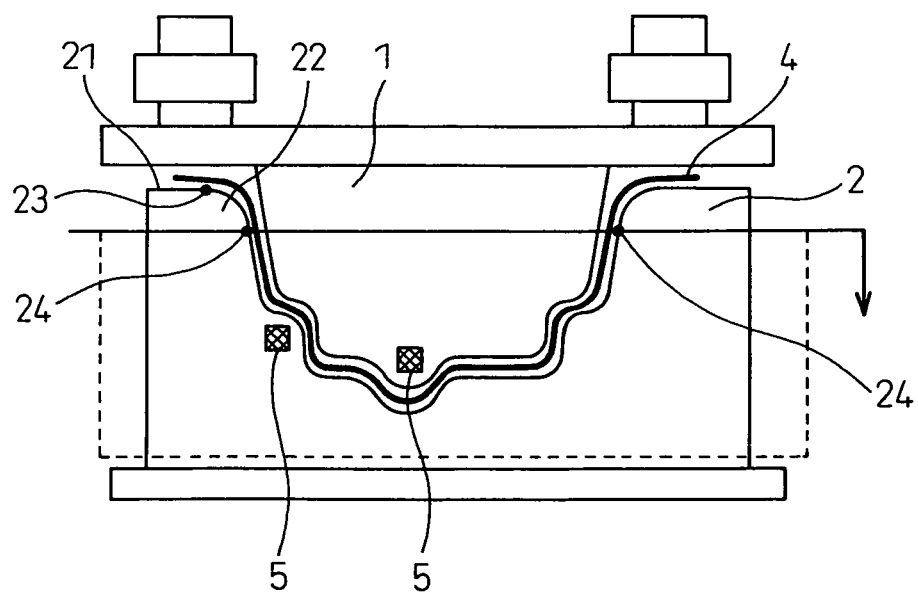
FIG. 4 is a detail view showing the device of FIG. 2, in which a mold strain measurement means is arranged in the device.

In order to effectively judge the forming defect such as a crack, necking or wrinkle, the installation position of strain measurement means 5 is very important. FIGS. 3 and 4 show preferable positions of strain measurement means 5.

In FIG. 3, die 2 is arranged on the press slide, and in FIG. 4, punch 1 is arranged on the press slide. In the both cases, the installation position of strain measurement means 5 is positioned at the press-direction side relative to a radius end of a die shoulder on the material flow-out side when the mold to be measured (punch 1 or die 2 in this case) is positioned at a lower dead point of press-forming.

The reason for such positioning of the strain measurement means is to prevent the mold from being broken or damaged due to the position of strain measurement means 5 in the mold. In particular, in die 2, if strain measurement means 5 is not positioned at the press-direction side relative to a radius end of a die shoulder on the material flow-out side, a bore in the mold for installing the strain measurement means is not likely to have a sufficient dimensional accuracy. Generally, a drill is used for forming the bore in the mold for strain measurement means 5. At this point, if the thickness of the mold between the bore for installing strain measurement means 5 and the surface of die 2 is small, the drill while processing may be bent toward the surface of the mold due to the insufficient rigidity of the drill, whereby the dimensional accuracy of the bore may be lowered. When such a problem occurs, the actual thickness of the mold is smaller than the directed dimension thereof, whereby a risk of breakage of the mold becomes higher. In order to avoid this problem, it is preferable that strain measurement means 5 be positioned at the press-direction side relative to the radius end of the die shoulder on the material flow-out side.

When strain measurement means 5 is not positioned at the press-direction side relative to the radius end of the die shoulder on the material flow-out side, a failure of processing other than the hole drilling may occur. For example a crack may occur in the mold during a thermal treatment. Even when the hole drilling and the thermal treatment are successfully carried out, the mold may be damaged due to the lack of strength of the mold after the mold is repeatedly used.

Figure 5:
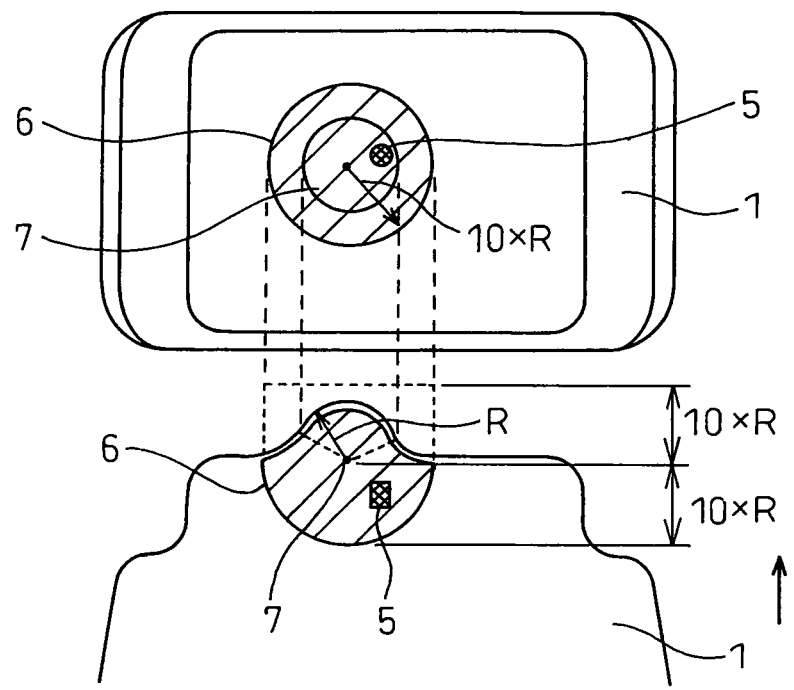
FIG. 5 is a view showing the device of the invention, in which the mold strain measurement means is arranged in the punch.
Figure 6:
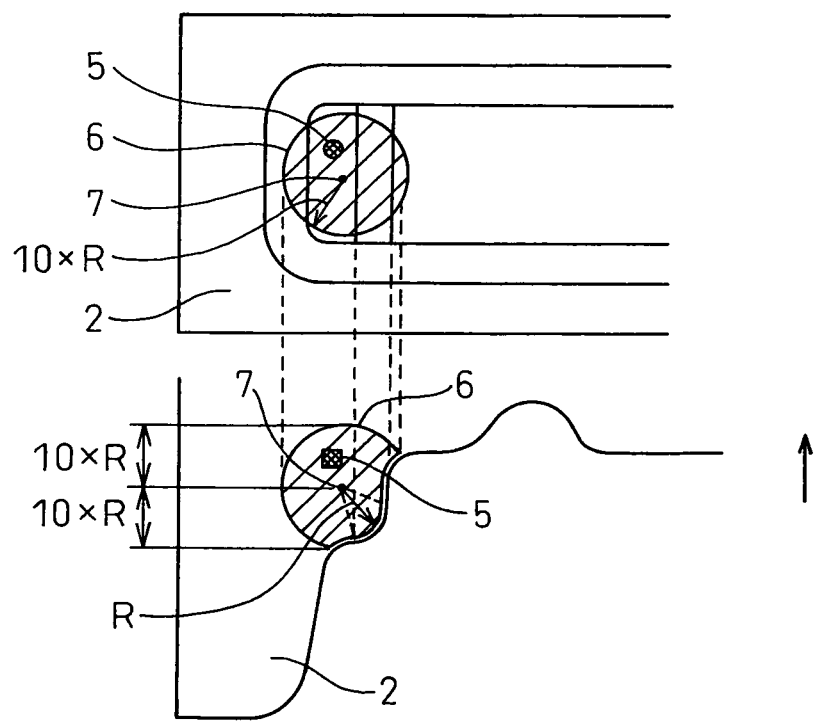
FIG. 6 is a view showing the device of the invention, in which the mold strain measurement means is arranged in the die.

FIGS. 5 and 6 show are cross sectional views of a press-forming device according to a second embodiment of the invention. In the second embodiment, the installation position of strain measurement means 5 is further limited in order to measure the strain amount more precisely than the first embodiment.

FIG. 5 is an enlarged view around strain measurement means 5 arranged in punch 1. As shown, strain measurement means 5 is positioned in an installation region 6 within the mold.

Preferable installation region 6 for strain measurement means 5 is defined by a surface which is away from a center of curvature 7 of a curved surface of the mold by the distance ten times R, where R is the curvature radius of the curved surface.

In the present invention, the curvature radius is defined as a radius curvature of a curved portion, in a cross section of the punch or the die parallel to the press direction, the curved portion being approximated by a part having a constant radius curvature. Based on the approximated curved portion, center of curvature 7 is determined.

Next, the reason, that the installation region of the strain measurement means is within a region defined by a surface which is away from center of curvature 7 of the curved surface of the mold by the distance ten times R, will be explained.

Figure 22:
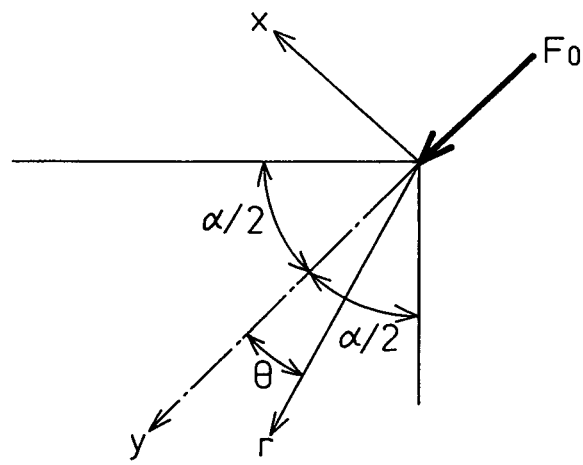
FIG. 22 is a schematic view showing a force is concentratively applied to an apex of a corner portion.

A theoretical solution of a concentrated force applied to a two-dimensional stress field has already been obtained by Melan, et al. (1932). For example, as shown in FIG. 22, a two-dimensional stress distribution when a concentrated force $F_0$ is applied to an apex of a corner having an angle $\alpha$ may be calculated by equation (1) below.

$$\sigma_r = -\frac{2F_0}{(\alpha + \sin\alpha)} \cdot \frac{\cos\theta}{r}, \quad \sigma_\theta = 0, \quad \tau_{r\theta} = 0 \qquad (1)$$

Figure 23:
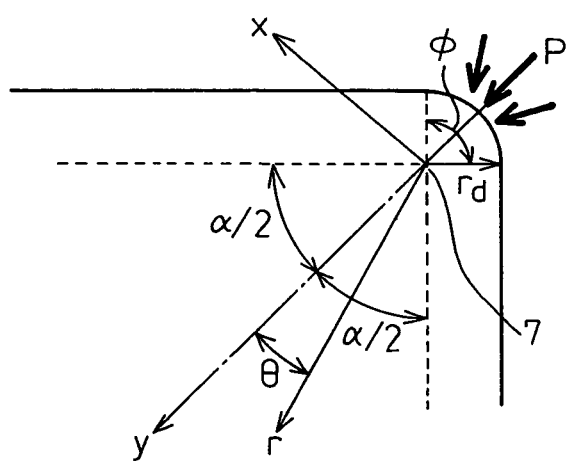
FIG. 23 is a schematic view showing a surface pressure is applied to a curved corner portion.

As shown in FIG. 23, even when a surface pressure P is applied to a curved portion having a radius $r_d$ and a radius curvature $\phi$, equation (1) may be utilized to obtain an approximated stress distribution if radius $r_d$ is small (0.3 mm<$r_d$<30.0 mm). In this case, the stress distribution may be calculated by equation (2).

$$\sigma_r = -\frac{2P\phi r_d}{(\alpha + \sin\alpha)} \cdot \frac{\cos\theta}{r}, \quad \sigma_\theta = 0, \quad \tau_{r\theta} = 0 \qquad (2)$$

As indicated in equations (1) and (2), in the two-dimensional stress distribution obtained by the concentrated force, the stress in the direction other than the radius direction in a polar coordinate system indicated by r, θ becomes zero. Also, the distribution of a stress $\sigma_r$ in the radius direction may be indicated by polar coordinates r, θ.

Figure 24:
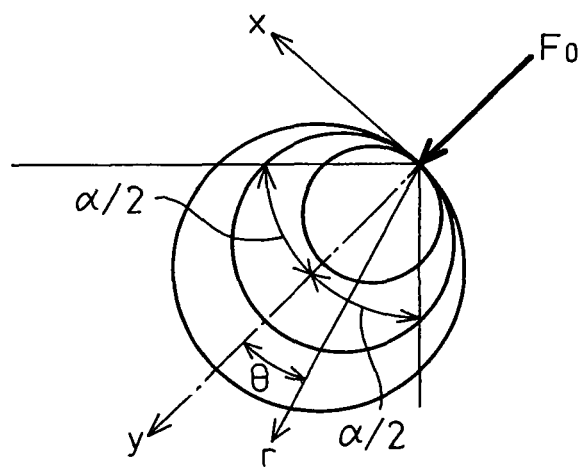
FIG. 24 shows contour lines of a stress distribution in the case of FIG. 22.

FIG. 24 shows contour lines of the stress distribution corresponding to equation (1).

Figure 25:
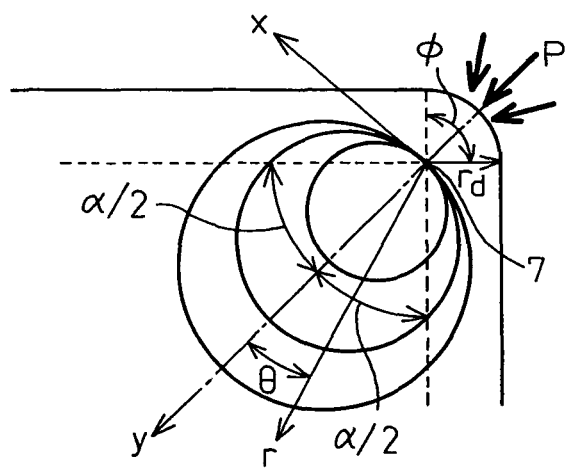
FIG. 25 shows contour lines of a stress distribution in the case of FIG. 23.

FIG. 25 shows contour lines of the stress distribution corresponding to equation (2).

Stress $\sigma_r$ in equation (2) may be simplified as indicated in equation (3), when angles α and φ are fixed to constant values and θ is equal to zero in the polar coordinate system.

$$\sigma_r = -\frac{P \cdot r_d}{r} \left( \text{where } \alpha = \frac{\pi}{2}, \ \theta = 0, \ \phi = \frac{\left(\frac{\pi}{2}+1\right)}{2} \right) \qquad (3)$$

Strain measurement means 5 can measure an elastic strain amount generated due to stress $\sigma_r$ in the radius direction as indicated in equations (2) and (3). However, similarly to another measurement means, there is a limitation in the finite resolution in strain measurement means 5. Therefore, it is difficult to measure a very small strain amount or a change of strain by the strain measurement means.

In order to measure with high accuracy by strain measurement means 5, it is assumed that the strain amount generated at the installation position of strain measurement means 5 must be equal to or larger than a minimum measurable strain amount $\epsilon_m$.

According to Hooke's law, stress $\sigma_m$ corresponding to minimum measurable strain amount $\epsilon_m$ may be represented by equation (4) by using an elastic modulus E.

$$\sigma_m = E \cdot \epsilon_m \qquad (4)$$

According to the above assumption, stress $\sigma_r$ in equation (3) must be larger than stress $\sigma_m$ in equation (4). Therefore, in relation to the polar coordinate r of the installation position of strain measurement means 5, equation (5) below is true.

$$r < \frac{P \cdot r_d}{E \cdot \epsilon_m} \qquad (5)$$

By using equation (5), the installation region for strain measurement means 5 may be determined, where the measurement means can measure the strain amount with high accuracy.

However, it is difficult to precisely calculate surface pressure P in equation (5) corresponding to a contact surface pressure between the mold and a steel sheet. This is because the installation region of the strain Measurement means must be determined before the mold is manufactured and thus a measured value cannot be used to determine the installation region. Although the surface pressure may be predicted by FEM or the like, the accuracy may be insufficient.

Accordingly, without taking into consideration surface pressure P which is difficult to be precisely calculated, it is assumed that stress $\sigma_m$ in equation (4) is equal to 10% of surface pressure P, in order to determine the installation region of strain measurement means 5. Then, equation (6) may be obtained by equation (3).

$$r < 10 r_d \qquad (6)$$

By using equation (6), the installation region r of strain measurement means 5 may be easily determined, without taking into consideration surface pressure P which is difficult to be precisely calculated. In the invention, therefore, the preferable installation position of strain measurement means is defined by a surface which is away from the center of curvature of the curved surface by the distance ten times R, where R is a curvature radius of the curved surface.

Figure 26:
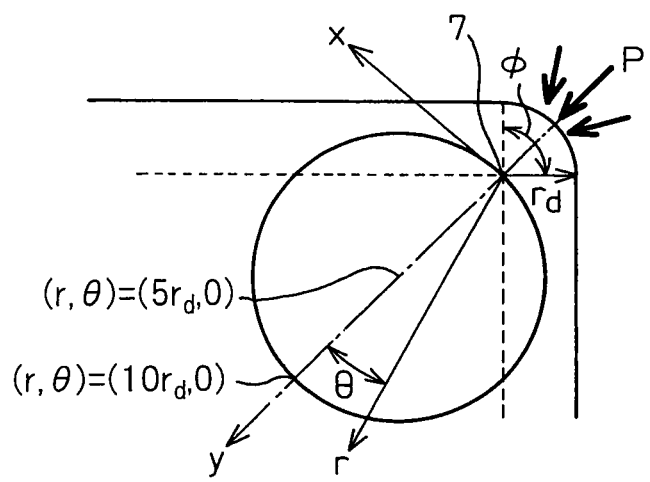
FIG. 26 shows a preferable installation area of the strain measurement means.

FIG. 26 shows the preferable installation region of strain measurement means 5 determined by equation (6). The installation region is a region within an arc having the radius $5r_d$, the coordinate (r, θ) of the center of which is equal to ($5r_d$, 0).

In the invention, the suitable installation region of strain measurement means 5 is determined by equation (6). In addition, the region determined by equation (6) may be further limited by calculating equation (5) using surface pressure P calculated by a FEM analysis, a theoretical analysis or previous data. However, it is not forbidden that the calculated result by equation (5) is larger than the installation region calculated by equation (6).

As a limitation of the installation region calculated by equation (6), equation (5) is calculated as described below, by using surface pressure P obtained by the theoretical analysis result.

Figure 27:
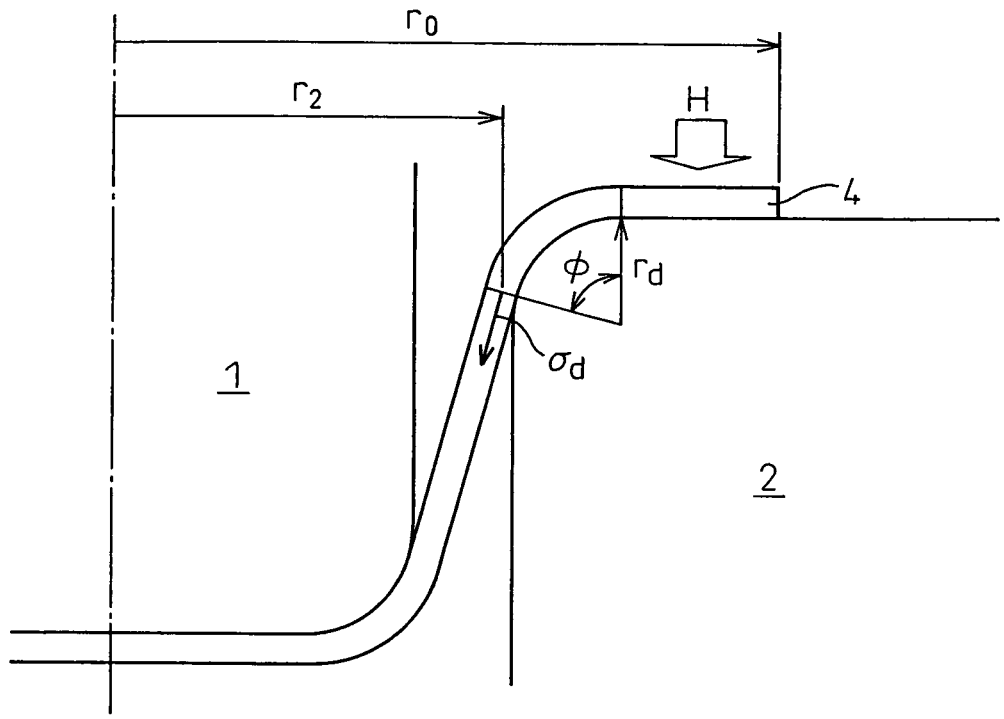
FIG. 27 is a schematic view showing a force or a stress applied to a workpiece in press-forming.

FIG. 27 schematically shows the shape of the press mold and the press-forming condition. A drawing stress $\sigma_d$ at R-portion of the die shoulder (or die shoulder R) may be represented by equation (7) by using a yield stress Y and a thickness t of workpiece 4; a friction coefficient μ between workpiece 4 and punch 1 or die 2; a blank-holding force H; a contact angle φ of a contact area between die 2 and workpiece 4; a distance $r_0$ from the center line of punch 1 to the end of workpiece 4; and a distance $r_2$ from the center line of punch 1 to a middle point of the thickness of the workpiece at the material flow-out side of the contact area between die 2 and workpiece 4.

$$\sigma_d = Y \exp(\mu\phi) \cdot \left( \ln\frac{r_0}{r_2} + \frac{2\mu H}{tY} \right) + \frac{t}{2r_d} Y \qquad (7)$$

Further, equation (7) may be modified as in equations (8-1) to (8-3).

$$\sigma_d = a_0 Y + C \qquad (8\text{-}1)$$

$$a_0 = \exp(\mu\phi) \cdot \left( \ln\frac{r_0}{r_2} \right) + \frac{t}{2r_d} \qquad (8\text{-}2)$$

$$C = \exp(\mu\phi) \cdot \left( \frac{2\mu H}{t} \right) \qquad (8\text{-}3)$$

At this point, when $\mu=0.15$, $\phi=\pi/2$ rad, $r_0=100$ mm, $r_2=90$ mm, $t=1.0$ mm, $r_d=10$ mm and $H=200$ N/mm, $a_0=0.18$, $C=75.94$ MPa.

Figure 28:
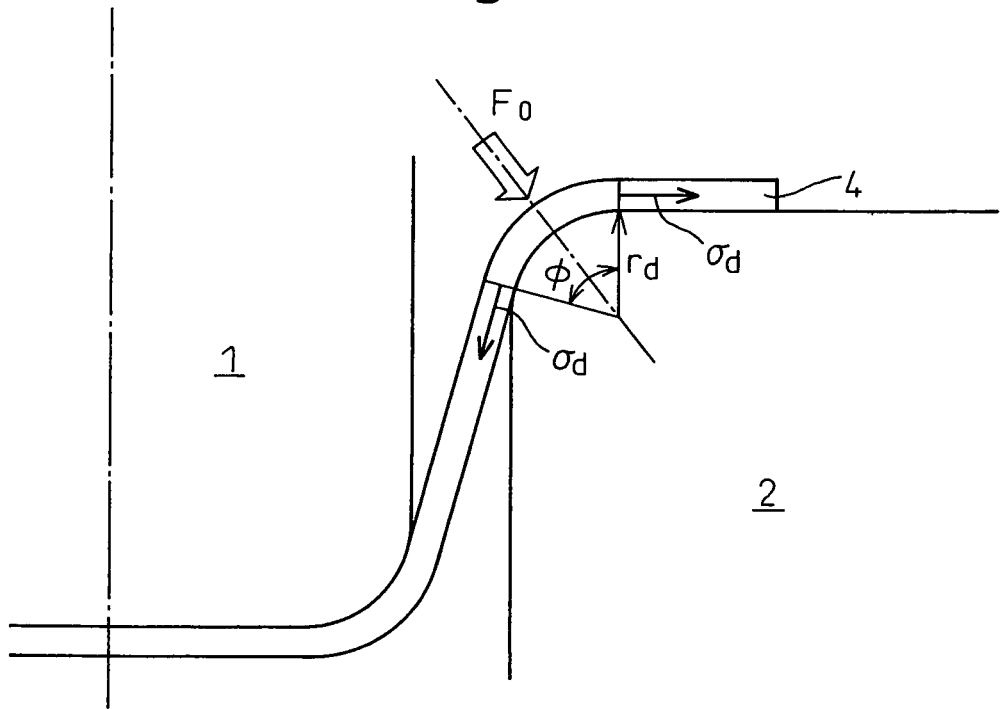
FIG. 28 is a schematic view showing a force or a stress applied to the die in press-forming.

On the other hand, as shown in FIG. 28, surface pressure P applied to die shoulder R may be represented by equation (9) using concentrated force $F_0$ applied to die shoulder R.

$$P = \frac{F_0}{\phi r_d} = \frac{2\sigma_d t \sin\left(\frac{\phi}{2}\right)}{\phi r_d} \quad (9)$$

When $\phi=\pi/2$ rad and $t=1.0$ mm, equation (10) below is true.

$$P = \frac{2\sqrt{2}\,\sigma_d}{\pi r_d} \quad (10)$$

By assigning equation (10) to equation (5), equation (11), regarding the suitable installation region of strain measurement means 5, is obtained.

$$r < \frac{2\sqrt{2}\,\sigma_d}{\pi E \varepsilon_m} \quad (11)$$

By assuming that elastic modulus $E=206$ GPa and $\varepsilon_m=10\mu\varepsilon$ and by assigning equations (8-1) to (8-3) to equation (11), equation (12) below is obtained.

$$r < 0.08Y + 33.19 \quad (12)$$

Figure 29:
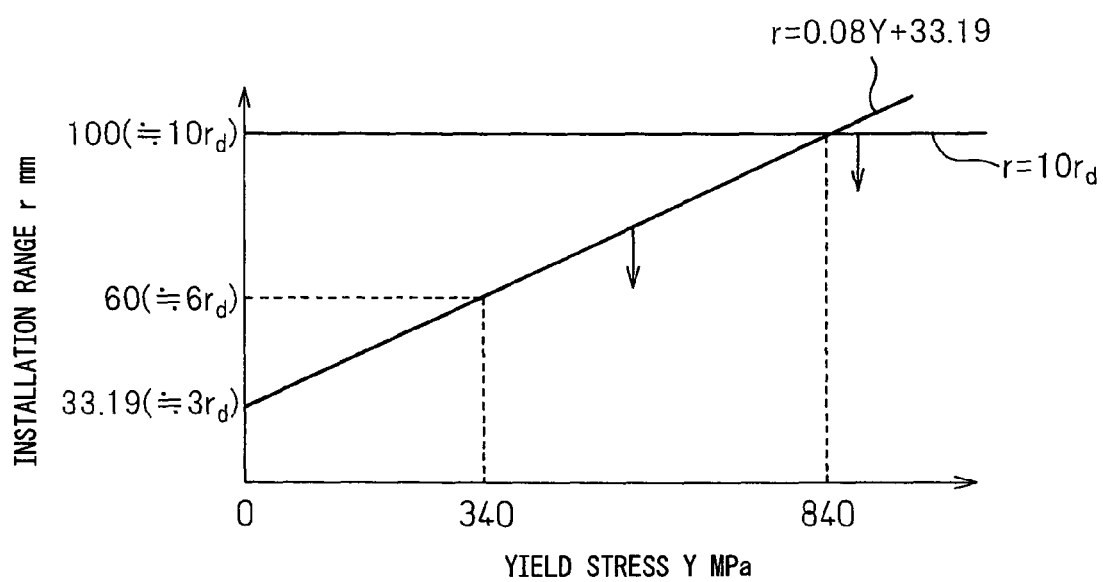
FIG. 29 is a graph explaining the limitation of the installation area of the strain measurement means.

FIG. 29 shows an example in which the installation region determined by equation (6) is further limited by using equation (12). When workpiece 4 having yield stress $Y=840$ MPa (corresponding to tensile strength of 1500 MPa) is used, the installation region of strain measurement means 5 is within ten times R, by using either equation (6) or equation (12). However, when workpiece 4 having yield stress $Y=340$ MPa (corresponding to tensile strength of 600 MPa) is used, the installation region of strain measurement means 5 is limited to within six times R, by using equation (12).

FIG. 6 is an enlarged view around strain measurement means 5 arranged in die 2. Similarly to the case of FIG. 5, strain measurement means 5 is arranged in installation region 6 indicated by hatching within the mold, as illustrated.

It is preferable that the strain measurement means is positioned a region near the center of curvature relative to surfaces each intersecting with each end portion of the curved surface of the mold and inclined, away from the curved surface, by 45 degrees relative to a normal line at each end portion (see FIGS. 30 and 32 as described below). Generally, the strain applied to the mold via the steel sheet becomes larger at the curved portion of the mold. At this point, the strain tends to progress in a region within the mold defined lines extending from a starting point for the strain on the surface and inclined by 45 degrees relative to the normal line at the starting point, and does not tend to progress in a region within the mold outside the defined lines. Therefore, by positioning the strain measurement means in a region near the center of curvature relative to surfaces each intersecting with each end portion of the curved surface of the mold and inclined, away from the curved surface, by 45 degrees relative to a normal line at each end portion, the strain of the curved portion of the mold may be sensitively measured.

Further, the strain measurement means is preferably positioned away from the surface of the mold to be measured by more than 5 mm. When the strain measurement means is positioned at the position which is not away from the surface by more than 5 mm, the strength of the surface near the strain measurement means may be lowered and the breakage may occur at the surface.

Figure 7:
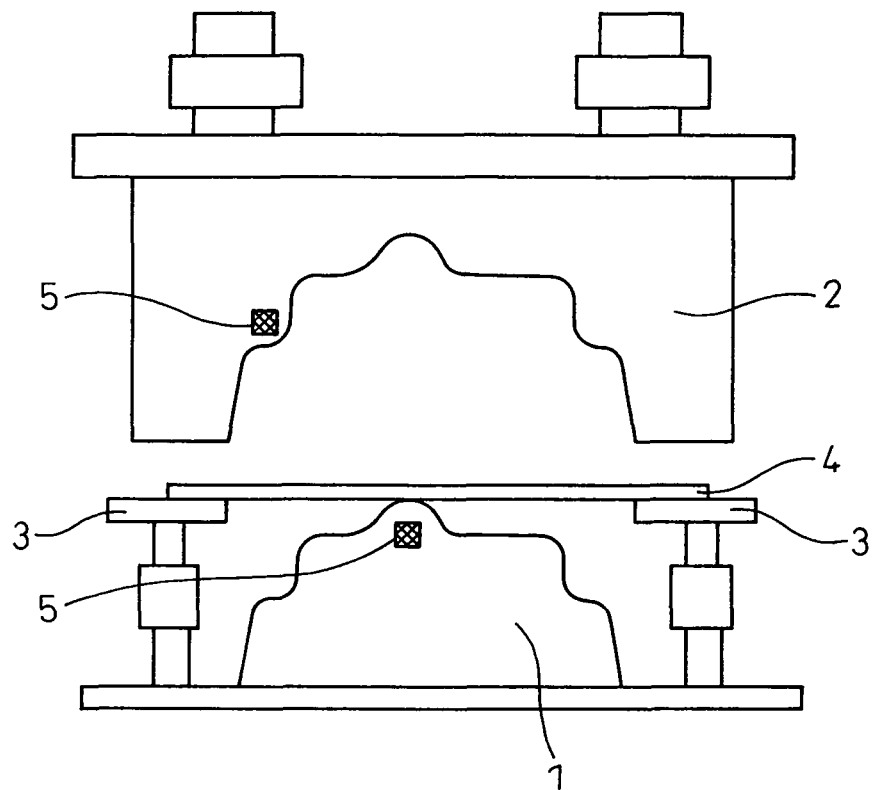
FIG. 7 is a schematic view of the device of FIG. 1, further comprising a blank-holding die.
Figure 8:
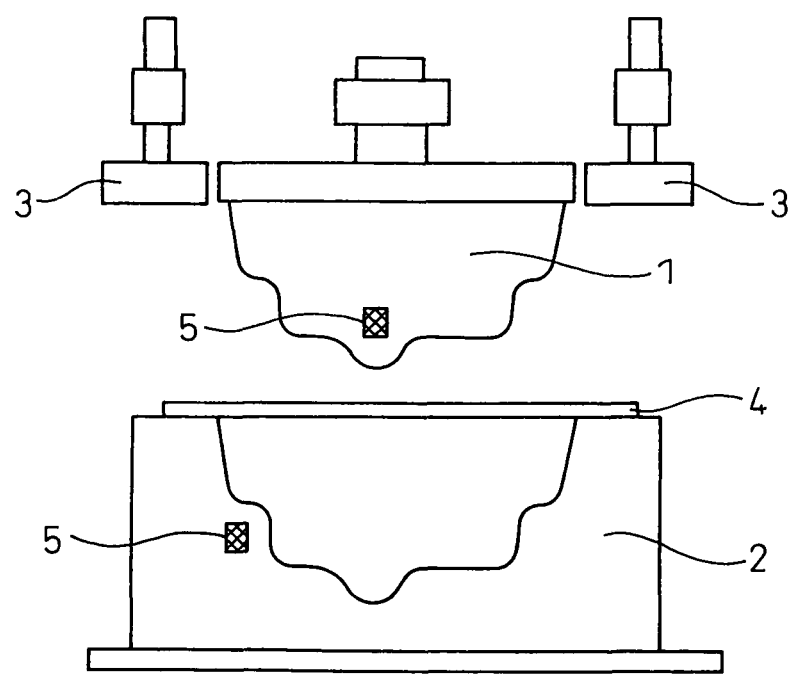
FIG. 8 is a schematic view of the device of FIG. 2, further comprising a blank-holding die.

FIGS. 7 and 8 are cross sectional views of a press-forming device according to a third embodiment of the invention. In FIG. 7, a blank-holding die 3 is added to the press-forming device of FIG. 1, whereby single-action drawing forming may be carried out.

On the other hand, in FIG. 8, a blank-holding die 3 is added to the press-forming device of FIG. 2, whereby double-action drawing forming may be carried out. In both cases, similarly to the cases in FIGS. 4 and 5, the same effect may be obtained by positioning strain measurement means 5 in the installation region as described above.

Figure 9A:
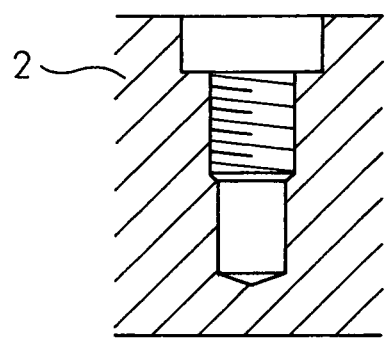
FIG. 9a is a view showing a hole to which the constitution of FIG. 9b may be attached.
Figure 9B:
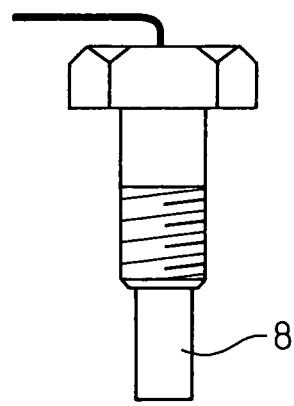
FIG. 9b is a side view of the strain measurement means and a plug.

FIGS. 9a and 9b show a concrete example of strain measurement means 5. In one example, a bore and an internal thread are formed in die 2 as shown in FIG. 9a, and then, a strain sensor 8 is inserted into the bore and a plug used to generate an axial force for press-fitting the sensor, as shown in FIG. 9b. At this point, when a piezoelectric element sensor is used as strain sensor 8, measurement with high frequency response may be carried out.

Figure 30:
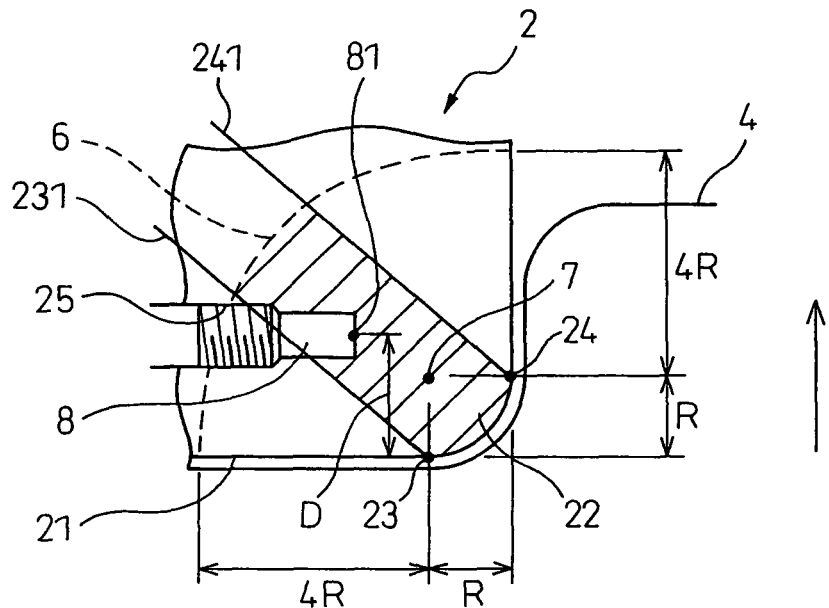
FIG. 30 shows a preferable installation area of the strain measurement means in a convex die.

FIG. 30 is a view explaining a preferable installation region for the strain measurement means. As described above, the strain measurement means is positioned at the press-direction side relative to the radius end of the die shoulder on the material flow-out side. Further, as shown in FIG. 30, when strain sensor 8 is press-fit in shoulder 22 of die 2, it is preferable that a distance D in the press direction between a measurement point (or a front end) 81 of sensor 8 and die surface 21 is equal to or smaller than the radius of a bore 25 formed in die 2, in view of the strength of the die. For example, when the radius of the die shoulder is equal to 2 mm and the radius of the bore is equal to 4 mm, it is preferable that the distance D is equal to or more than 4 mm, more preferably, equal to or more than 5 mm.

In addition, as shown in FIG. 30, when strain sensor 8 extends in the direction perpendicular to the press direction, a friction force between the workpiece and the die may be detected without being affected by the press force.

Figure 31:
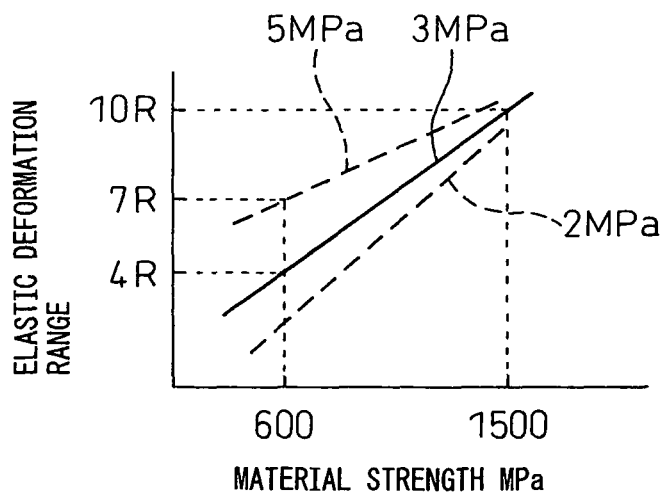
FIG. 31 is a graph showing the relation between the strength of the workpiece and the elastic deformation range in press-forming.

Next, the preferable installation region for the strain measurement means will be explained. It has been observed that the distribution of elastic strain of die 2 generated by press-forming becomes larger as the R-portion of the die shoulder is enlarged. For example, when a workpiece having the strength of 600 MPa is press-formed with a blank-holding force of 3 MPa, the elastic deformation region is within a region which is not away from center of curvature 7 by a distance four times the radius of the R-portion. At this point, there is a linear relationship between the size of the elastic deformation region and the strength of the workpiece. For example, as indicated by a solid line in a graph as shown in FIG. 31, when the workpiece has the strength of 1500 MPa which is believed an upper limit in a general press-forming, the elastic deformation region is within a region which is not array from center of curvature 7 by a distance ten times the radius of the R-portion. In other words, the size of the elastic deformation region may be calculated by multiplying a suitable coefficient by a product of the strength of the workpiece and the radius of the die shoulder.

The elastic deformation region is varied depending on the blank-holding force, as indicated by dashed lines in the graph of FIG. 31, each representing a case in which the blank-holding force is equal to 2 MPa or 5 MPa. As shown, the influence of the blank-holding force is relatively large when the strength of the workpiece is small, and decreases as the strength becomes larger. For example, when the blank-holding force and the strength of the workpiece are equal to 5 MPa and 600 MPa, respectively, the elastic deformation region is within a region which is not away from the center of curvature by a distance seven times the radius of the R-portion. On the other hand, when the strength of the workpiece is equal to 1500 MPa, the elastic deformation region is not substantially varied. Accordingly, a suitable installation region 6 for the strain measurement is within a region which is not away from the center of curvature by a distance ten times the radius of the R-portion, and which may vary depending on the strength of the workpiece and/or the blank-holding force.

Further, as shown in FIG. 30, the elastic strain of die 2 may be measured more sensitively when the strain measurement means is positioned within a region near the center of curvature relative to surfaces 231 and 241 (indicated by lines in FIG. 30) each intersecting with each of radius ends 23 and 24 of the curved surface of the mold and inclined, away from the curved surface, by 45 degrees relative to a normal line at each end portion. Therefore, the region with hatching in FIG. 30 is the most preferable region for the measurement point of the strain sensor.

Figure 32:
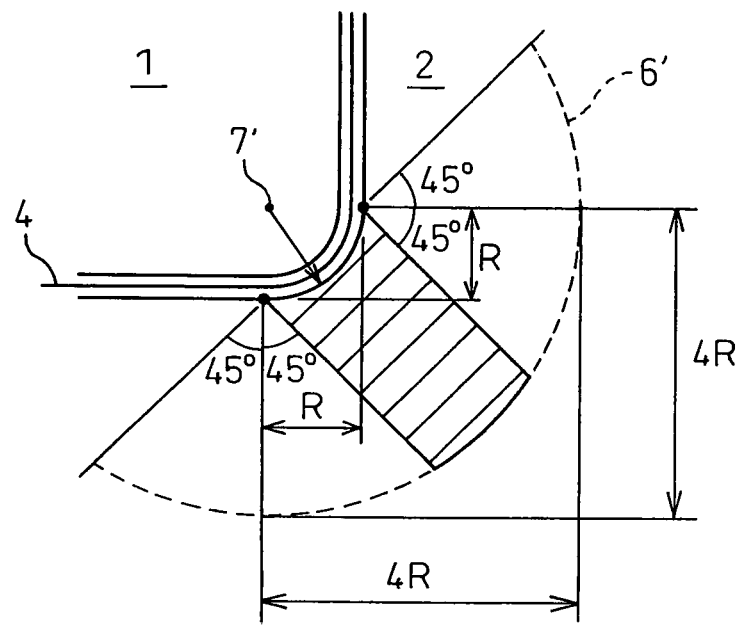
FIG. 32 shows a preferable installation area of the strain measurement means in a concave die.

Although FIG. 30 explains the case of the die shoulder having the convex shape, the similar concept may be applied to the case of the punch or the die having the concave shape, as shown in FIG. 32. However, in the case of the die or the punch having the concave shape, a center of curvature 7' is positioned outside the die or the punch to be measured. In this case, when a workpiece having the strength of 600 MPa is press-formed with a blank-holding force of 3 MPa, a preferable installation region 6' for the strain measurement means is within a region indicated by a generally semispherical shape which is not away from center of curvature 7' by a distance four times the radius of the R-portion. In the example of FIG. 32, the region with hatching is the most preferable region for the measurement point of the strain sensor.

Figure 33:
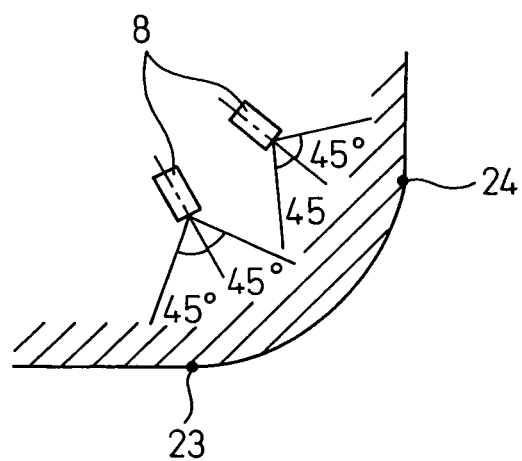
FIG. 33 shows an example of the installation of the strain measurement means in a portion having a large curvature radius.

As shown in FIG. 33, when the curvature of the convex or concave portion is considerably large (for example, R≥100 mm), it may be difficult to measure the elastic deformation of the die or the punch between radius ends 23 and 24 by using one strain sensor. In such a case, a plurality of (two in the drawing) sensors 8 may be effectively used. The number of the sensors may be properly determined. As shown in FIG. 33, a preferable detecting region of each sensor is generally defined by lines extending from the front end of the sensor and inclined by ±45 degrees. The number of the sensors may be determined based on the detecting region of each sensor.

Figure 10:
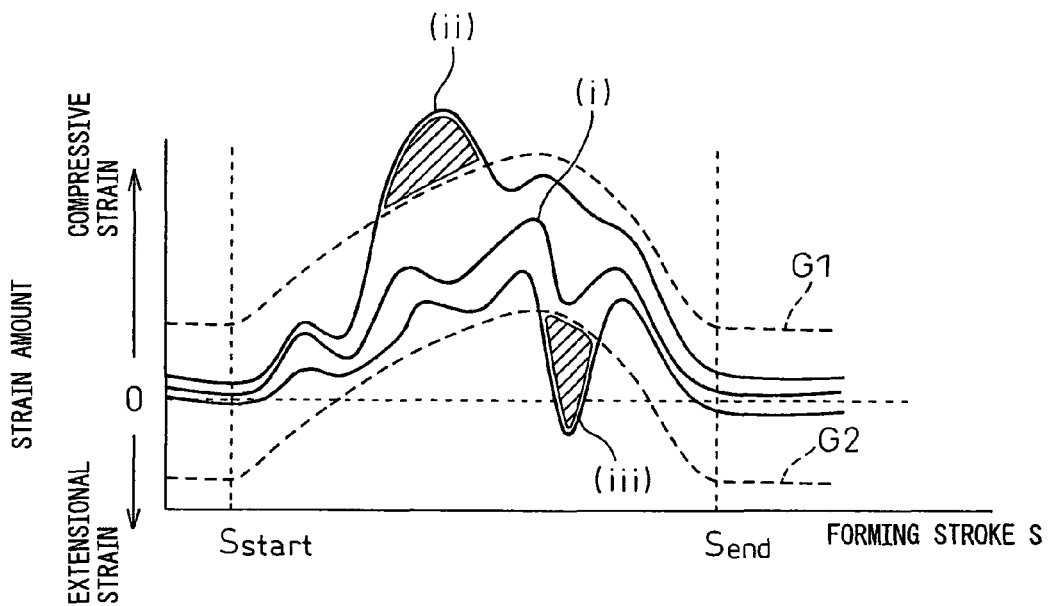
FIG. 10 shows a measurement result of a strain amount and a predetermined range for judging the defect of a product, according to a press-forming method of the invention.

Next, a press-forming method, capable of judging a defect of a formed product, will be explained with reference to FIG. 10. FIG. 10 is a graph showing a measurement result of a strain amount by using strain sensor 8. In the graph, a horizontal axis indicates a forming stroke S. $S_{start}$ means the position of the press slide when forming of workpiece 4 begins, and $S_{end}$ means the position of the press slide when the slide reaches a lower dead point of press-forming and forming of workpiece 4 is finished. On the other hand, a vertical axis of the graph indicates a strain amount. At this point, the compressive strain is indicated by a plus (positive) value.

In FIG. 10, dashed lines G1 and G2 indicate upper and lower limits of a predetermined or threshold range of the strain amount, respectively. A method for determining the upper and lower limits of the range of the strain amount will be explained. A plurality of press-forming operations are carried out, and then, strain amount data in which a formed product has no defect is acquired. An average strain amount of ten or more of the data including no defect is used for judging the forming defect.

Further, in the plurality of press-forming operations, strain amount data exceeding the above average strain amount is acquired. An average strain amount of ten or more of the data exceeding the average is used as an upper limit of a predetermined strain amount range.

Similarly, in the plurality of press-forming operations, strain amount data falling below the above average strain amount is acquired. An average strain amount of ten or more of the data falling below the average is used as a lower limit of the predetermined strain amount range.

FIG. 10 indicates, as an example, three measurement results of strain amounts (i), (ii) and (iii). Measurement result (i) is judged as having no problem in press-forming, since this result is within the predetermined strain amount range. On the other hand, measurement result (ii) is judged as including the forming defect, since a part of which exceeds the upper limit of the predetermined range. Similarly, measurement result (iii) is judged as including the forming defect, since a part of which falling below the lower limit of the predetermined range. In such a way, the forming defect of the formed product is judged.

In particular, as in measurement result (iii), when a part of the measurement result falls below the lower limit of the predetermined range while forming stroke S is equal to or larger than fifty percent of $S_{end}$ (i.e., in a latter half of the press-forming operation), it is judged that a crack or a necking is generated in the formed product.

In particular, as in measurement result (ii), when a part of the measurement result exceeds the upper limit of the predetermined range while forming stroke S is equal to or smaller than fifty percent of $S_{end}$ (i.e., in a former half of the press-forming operation), it is judged that a springback or an abnormal flow-in volume of the material occurs in the formed product.

In particular, when a part of the measurement result exceeds the upper limit of the predetermined range while forming stroke S is equal to or larger than fifty percent of $S_{end}$ (i.e., in the latter half of the press-forming operation), it is judged that a wrinkle is generated in the formed product.

Figure 11:
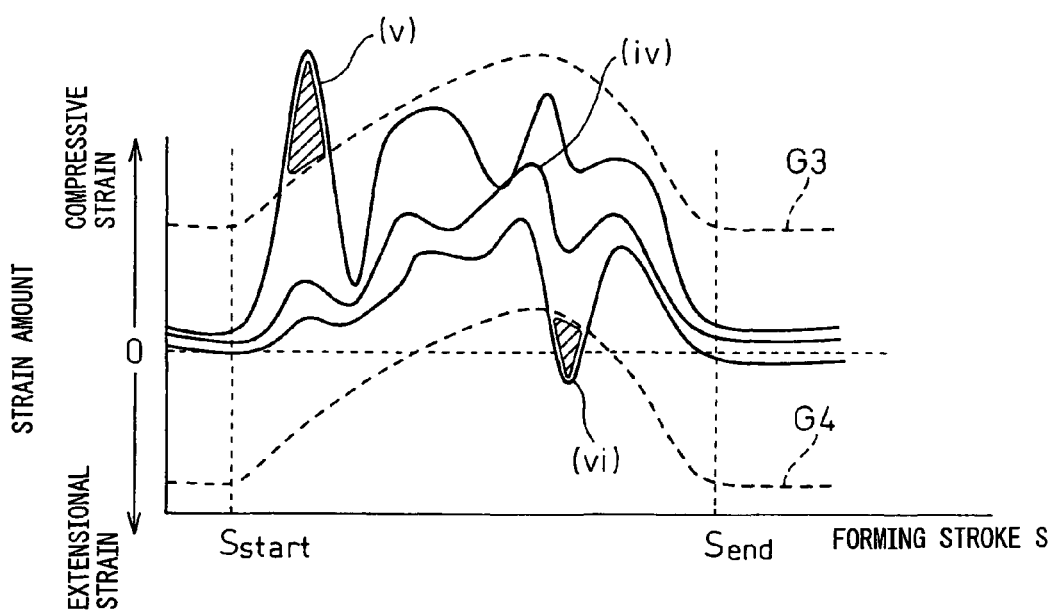
FIG. 11 shows a measurement result of a strain amount and a predetermined range for judging the defect of the mold, according to a press-forming method of the invention.

Next, a press-forming method, capable of judging a defect of the press mold, will be explained with reference to FIG. 11. Similarly to FIG. 10, FIG. 11 is a graph showing a measurement result of a strain amount. In FIG. 11, dashed lines G3 and G4 indicate upper and lower limits of a predetermined or threshold range of the strain amount, respectively.

A method for determining the upper and lower limits of the range of the strain amount will be explained. Similarly to the case for judging the formed product, a plurality of press-forming operations are carried out, and then, strain amount data in which the press mold has no defect is acquired. An average strain amount of fifty or more of the data including no defect is used for judging the mold defect.

Further, in the plurality of press-forming operations, strain amount data exceeding the above average strain amount is acquired. An average strain amount of fifty or more of the data exceeding the average is used as an upper limit of a predetermined strain amount range.

Similarly, in the plurality of press-forming operations, strain amount data falling below the above average strain amount is acquired. An average strain amount of fifty or more of the data falling below the average is used as a lower limit of the predetermined strain amount range.

FIG. 11 indicates, as an example, three measurement results of strain amounts (iv), (v) and (vi). Measurement result (iv) is judged as having no problem in the mold, since this result is within the predetermined strain amount range. On the other hand, measurement result (v) is judged as including the mold defect, since a part of which exceeds the upper limit of the predetermined range. Similarly, measurement result (v) is judged as including the mold defect, since a part of which falling below the lower limit of the predetermined range. In such a way, the forming defect of the press mold is judged.

In particular, when a part of the measurement result exceeds the upper limit of the predetermined range while forming stroke S is equal to or smaller than fifty percent of $S_{end}$ (i.e., in a former half of the press-forming operation), it is judged that a sticking is generated in the press mold.

As shown in FIG. 10, when the measurement result of the strain amount exceeds the upper limit due to the forming defect (graph (ii)), the graph tends to exceeds the upper limit at a second local maximum point from $S_{start}$. On the other hand, as shown in FIG. 11, when the measurement result of the strain amount exceeds the upper limit due to the mold defect (graph (v)), the graph tends to exceeds the upper limit at a first local maximum point from $S_{start}$. Due to this, the forming defect and the mold defect may be distinguished from each other.

Example 1

Based on the present invention, the press-forming device as shown in FIG. 3 was manufactured to carry out press-forming, as an example 1. The characteristic of a steel sheet used as a workpiece is indicated in table 1. The thickness and the tensile strength of the used steel sheet were 1.8 mm and 590 MPa, respectively.

TABLE 1

| Material | Yield stress [MPa] | Tensile strength [MPa] | Elongation [%] |
|---|---|---|---|
| Steel Sheet | 379 | 608 | 35 |

Figure 12:
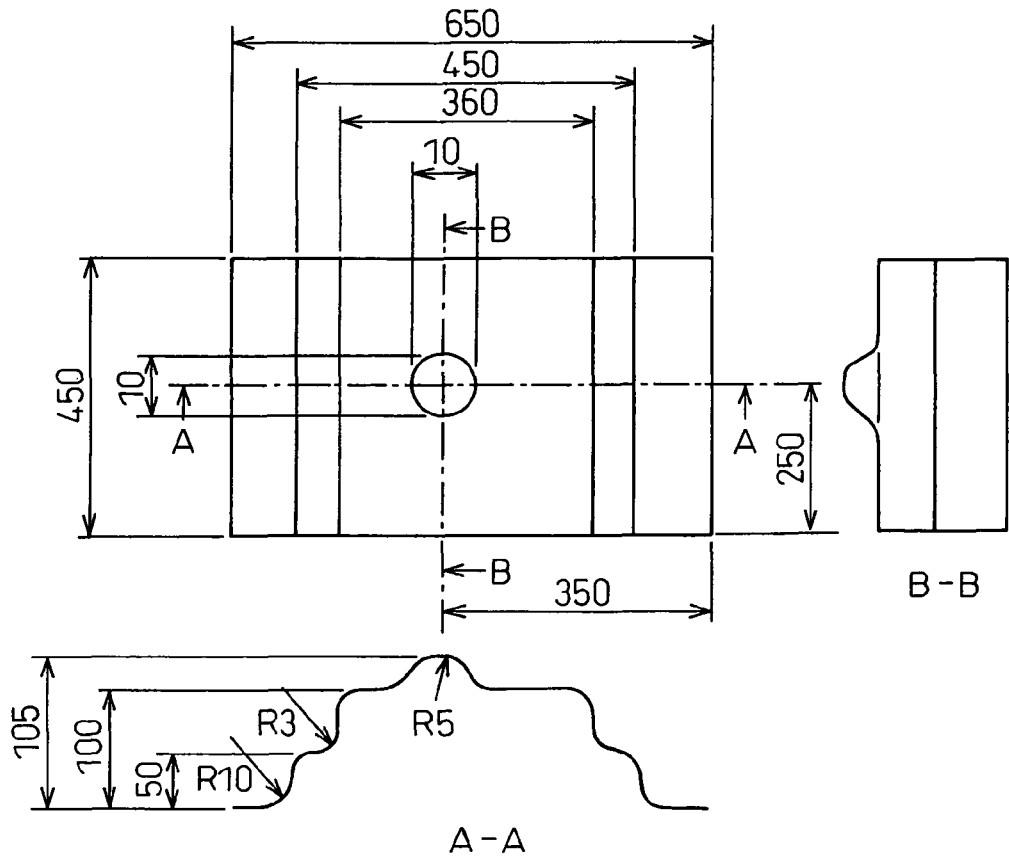
FIG. 12 is an external view of a product formed by the press-forming device of the invention.

The shape of the member formed by the press-forming device is shown in FIG. 12. The cross section of the member has a but shape, as indicated by a cross section A-A in FIG. 12. The member has a vertical wall with a bent portion such that the tension may be applied to the vertical wall and the forming defect at the wall may be reduced.

Figure 13:
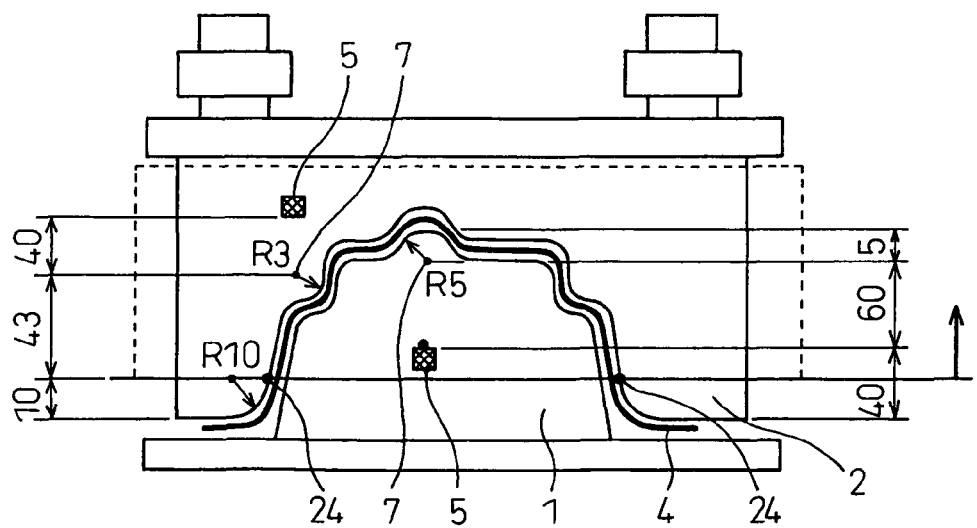
FIG. 13 is a view indicating an installation position of the strain measurement means.

In the press-forming, both the punch and the die were selected as the mold to be measured and, as shown in FIG. 13, two strain measurement means 5 were arranged, i.e., one in punch 1 and the other in die 2.

Each of the two strain measurement means was positioned at the press-direction side relative to the radius end of the die shoulder on the material flow-out side when the punch and the tie were positioned at a lower dead point of press-forming. The press-direction is indicated by an arrow in the drawing.

The radius curvature of the convex curved portion on the surface R5 of punch 1 was 5 mm, and strain measurement means 5 within the punch was positioned away from center of curvature 7 by −60 mm in the press-direction. In other words, strain measurement means 5 was positioned outside the region defined by the distance ten times R from center of curvature 7.

The radius curvature of the convex curved portion on the surface R3 of die 2 was 3 mm, and strain measurement means 5 within the die was positioned away from center of curvature 7 by +40 mm in the press-direction. In other words, strain measurement means 5 was positioned outside the region defined by the distance ten times R from center of curvature 7.

In order to arrange strain measurement means 5, as shown in FIG. 9a, a non-though bore was formed in the mold and internal threads were formed on the bore, as shown in FIG. 9a. Further, a strain sensor 8 as shown in FIG. 9 was inserted into the bore and then a plug was inserted so as to apply an axial force for press-fitting.

As strain sensor 8, a piezoelectric element sensor was used. The direction of compressive or extensional strain measured by the sensor was the same as the press-direction.

Figure 14:
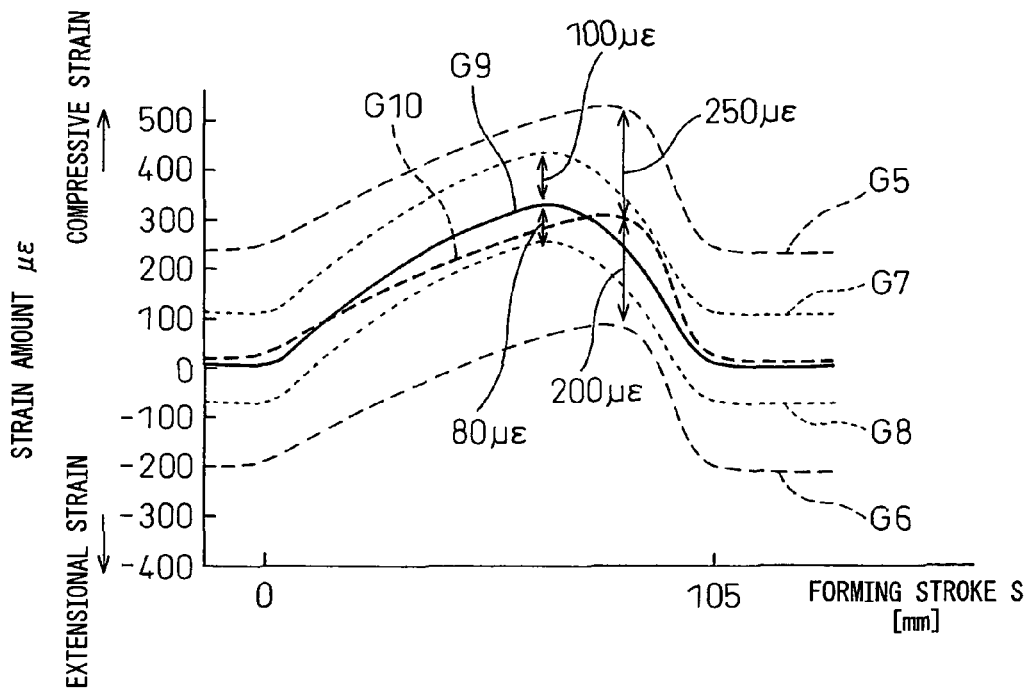
FIG. 14 is a view explaining a method for judging the defect of the product or the mold, according to the press-forming method of the invention.

The strain amount measured by strain measurement means 5 arranged as such were plotted in a graph as shown in FIG. 14. The mold defect and the forming defect were judged by using a predetermined strain amount range (sandwiched by an upper limit G5 and a lower limit G6) for judging the mold defect, and a predetermined strain amount range (sandwiched by an upper limit G7 and a lower limit G8) for judging the forming defect, respectively.

In the press-forming, a stroke when forming of workpiece 4 was started was 0 mm, and a stroke when the forming was finished was 105 mm. An average strain amount G9 for judging the forming defect was determined by carrying out one hundred press-forming operations, and by averaging strain amount data obtained by strain sensor 8 of seventy-five press-forming operations including no forming defect.

Among the above one hundred operations, strain amount data including forming defect was acquired and then, in eleven data, the strain amount exceeded average strain amount G9. Therefore, an average of the eleven data was determined as upper limit G7 of the strain amount range. In addition, the upper limit was generally equal to a graph obtained by adding 100µε to average strain amount G9 throughout a range of stroke.

Among the above one hundred operations, strain amount data including forming defect was acquired and then, in fourteen data, the strain amount was below average strain amount G9. Therefore, an average of the fourteen data was determined as lower limit G8 of the strain amount range. In addition, the lower limit was generally equal to a graph obtained by subtracting 80µε from average strain amount G9 throughout a range of stroke.

Similarly, an average strain amount G10 for judging the mold defect was determined by carrying out one thousand press-forming operations, and by averaging strain amount data obtained by strain sensor 8 of eight hundreds and ninety-five press-forming operations including no mold defect.

Among the above one thousand operations, strain amount data including mold defect was acquired and then, in fifty-two data, the strain amount exceeded average strain amount G10. Therefore, an average of the fifty-two data was determined as upper limit G5 of the strain amount range. In addition, the upper limit was generally equal to a graph obtained by adding 250µε to average strain amount G10 throughout a range of stroke.

Among the above one thousand operations, strain amount data including mold defect was acquired and then, in fifty-three data, the strain amount was below average strain amount G10. Therefore, an average of the fifty-three data was determined as lower limit G6 of the strain amount range. In addition, the lower limit was generally equal to a graph obtained by subtracting 200µε from average strain amount G10 throughout a range of stroke.

Tables 2 to 5 indicate the test result of the press-forming by using the press-forming device manufactured as example 1.

TABLE 2

| Strain measurement means is positioned in die | | Total Number of Products | Number of Products Having No Defect | Number of Products Having Defect | Items of Defective Products | | | | |
|---|---|---|---|---|---|---|---|---|---|
| | | | | | Crack | Wrinkle | Surface Strain | Springback | Flow-in Amount Defect |
| Inspection Result of Products | | 19471 | 18257 | 1214 | 231 | 14 | 0 | 598 | 371 |
| Judgment by Strain Measurement Means | | 19471 | 18214 | 1257 | | | | | |
| Items of Defect Judgment | Normal Judgment (Inspection Result Coincides with Defect Judgment) | | | 1207 | | | | | |
| | Over-detect | | | 50 | | | | | |
| | Under-detect | | | 7 | | | | | |
| Defect Rate (Number of Products Having Defect/Total Number of Products) | | | 6.23% | | 1.19% | 0.07% | 0.00% | 3.07% | 1.91% |
| Defect judgment Rate (Number of Products in Normal Judgment/Total Number of Products) | | | 6.20% | | | | | | |
| Over-detect Rate (Number of Over-detected Products/Total Number of Products) | | | 0.26% | | | | | | |
| Under-detect Rate (Number of Under-detected Products/Total Number of Products) | | | 0.04% | | | | | | |

Table 2 indicates a result of product inspection for detecting a product defect such as a crack or a springback and a result of judgment of the product defect by using the strain amount data obtained by strain measurement means 5 positioned in die 2. Due to strain measurement means 5, the defect judgment rate of 6.20% was obtained, where the defect rate was 6.23%. The over-detect rate and under-detect rate were 0.26% and 0.02%, respectively.

Similarly to the above, table 3 indicates a result of product inspection for detecting a product defect such as a crack or a wrinkle and a result of judgment of the product defect by using the strain amount data obtained by strain measurement means 5 positioned in punch 1. Due to strain measurement means 5, the defect judgment rate of 5.54% was obtained, where the defect rate was 5.65%. The over-detect rate and under-detect rate were 0.92% and 0.11%, respectively.

TABLE 3

| Strain measurement means is positioned in punch | | Total Number of Products | Number of Products Having No Defect | Number of Products Having Defect | Items of Defective Products | | | | |
|---|---|---|---|---|---|---|---|---|---|
| | | | | | Crack | Wrinkle | Surface Strain | Springback | Flow-in Amount Defect |
| Inspection Result of Products | | 19471 | 18370 | 1101 | 394 | 298 | 384 | 0 | 25 |
| Judgment by Strain Measurement Means | | 19471 | 18212 | 1259 | | | | | |
| Items of Defect Judgment | Normal Judgment (Inspection Result Coincides with Defect Judgment) | | | 1079 | | | | | |
| | Over-detect | | | 180 | | | | | |
| | Under-detect | | | 22 | | | | | |
| Defect Rate (Number of Products Having Defect/Total Number of Products) | | | 5.65% | | 2.02% | 1.53% | 1.97% | 0.00% | 0.13% |
| Defect judgment Rate (Number of Products in Normal Judgment/Total Number of Products) | | | 5.54% | | | | | | |
| Over-detect Rate (Number of Over-detected Products/Total Number of Products) | | | 0.92% | | | | | | |
| Under-detect Rate (Number of Under-detected Products/Total Number of Products) | | | 0.11% | | | | | | |

TABLE 4

| Strain measurement means is positioned in die | | Total Number of Products | Number of Products Having No Defect | Number of Products Having Defect | Items of Defective Molds | | |
|---|---|---|---|---|---|---|---|
| | | | | | Crack of Mold | Sticking | Scratch by Nipped Foreign Matter |
| Inspection Result of Molds | | 1523784 | 1523740 | 44 | 3 | 39 | 2 |
| Judgment by Strain Measurement Means | | 1523784 | 1523739 | 45 | | | |
| Items of Defect Judgment | Normal Judgment (Inspection Result Coincides with Defect Judgment) | | | 37 | | | |
| | Over-detect | | | 8 | | | |
| | Under-detect | | | 7 | | | |
| Defect Rate [ppm] (Number of Products Having Defect/Total Number of Products) | | | 28.9 | | 2.0 | 25.6 | 1.3 |
| Defect judgment Rate [ppm] (Number of Products in Normal Judgment/Total Number of Products) | | | 24.3 | | | | |
| Over-detect Rate [ppm] (Number of Over-detected Products/Total Number of Products) | | | 5.3 | | | | |
| Under-detect Rate [ppm] (Number of Under-detected Products/Total Number of Products) | | | 4.6 | | | | |

Table 4 indicates a result of mold inspection for detecting a mold defect such as a crack or a sticking and a result of judgment of the mold defect by using the strain amount data obtained by strain measurement means 5 positioned in die 2. Due to strain measurement means 5, the defect judgment rate of 24.3 ppm was obtained, where the defect rate was 28.9 ppm. The over-detect rate and under-detect rate were 5.3 ppm and 4.6 ppm, respectively.

Table 5 indicates a result of mold inspection for detecting a mold defect such as a crack or a sticking and a result of judgment of the mold defect by using the strain amount data obtained by strain measurement means 5 positioned in punch 1. Due to strain measurement means 5, the defect judgment rate of 27.6 ppm was obtained, where the defect rate was 32.8 ppm. The over-detect rate and under-detect rate were 8.5 ppm and 5.3 ppm, respectively.

TABLE 5

| Strain measurement means is positioned in punch | | Total Number of Products | Number of Products Having No Defect | Number of Products Having Defect | Items of Defective Molds | | |
|---|---|---|---|---|---|---|---|
| | | | | | Crack of Mold | Sticking | Scratch by Nipped Foreign Matter |
| Inspection Result of Molds | | 1523784 | 1523734 | 50 | 3 | 2 | 45 |
| Judgment by Strain Measurement Means | | 1523784 | 1523729 | 55 | | | |
| Items of Defect Judgment | Normal Judgment (Inspection Result Coincides with Defect Judgment) | | | 42 | | | |
| | Over-detect | | | 13 | | | |
| | Under-detect | | | 8 | | | |
| Defect Rate [ppm] (Number of Products Having Defect/Total Number of Products) | | | 32.8 | | 2.0 | 1.3 | 29.5 |
| Defect judgment Rate [ppm] (Number of Products in Normal Judgment/Total Number of Products) | | | 27.6 | | | | |
| Over-detect Rate [ppm] (Number of Over-detected Products/Total Number of Products) | | | 8.5 | | | | |
| Under-detect Rate [ppm] (Number of Under-detected Products/Total Number of Products) | | | 5.3 | | | | |

Due to the above results, it is understood that judgment of defect of the product or the mold was achieved according to the invention.

Example 2

Based on the present invention, the press-forming device as shown in FIG. 4 or 5 was manufactured to carry out press-forming, as an example 2.

The characteristic of a steel sheet used as a workpiece is indicated in table 1. The shape of the member formed by the press-forming device is shown in FIG. 12.

Figure 15:
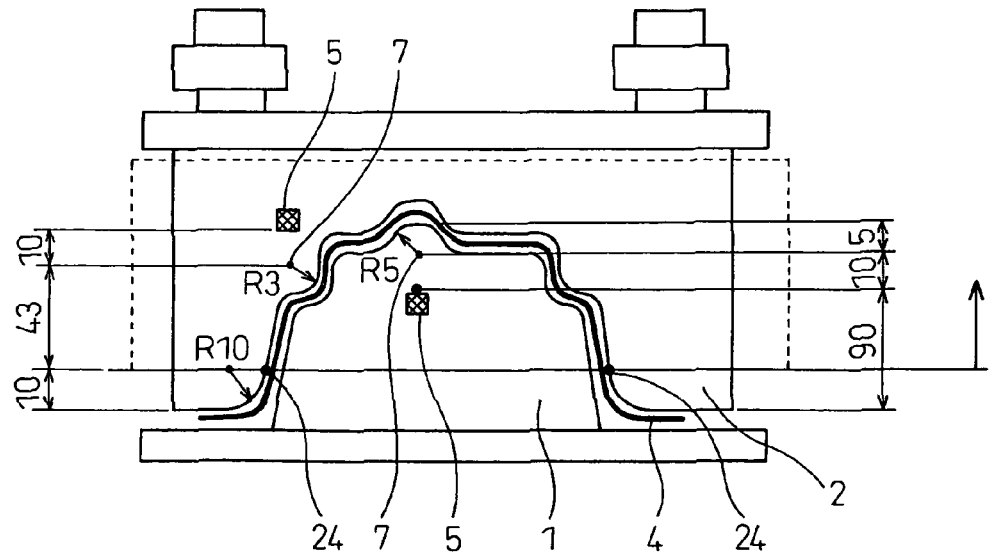
FIG. 15 is a view indicating another installation position of the strain measurement means.

In the press-forming, both the punch and the die were selected as the mold to be measured and, as shown in FIG. 15, two strain measurement means 5 were arranged, i.e., one in punch 1 and the other in die 2. Each of the two strain measurement means was positioned at the press-direction side relative to the radius end of the die shoulder on the material flow-out side when the punch and the tie were positioned at a lower dead point of press-forming. The press-direction is indicated by an arrow in the drawing.

Further, a strain sensor 8 as shown in FIG. 9 was inserted into the bore and then a plug was inserted so as to apply an axial force for press-fitting.

As strain sensor 8, a piezoelectric element sensor was used. The direction of compressive or extensional strain measured by the sensor was the same as the press-direction.

Figure 16:
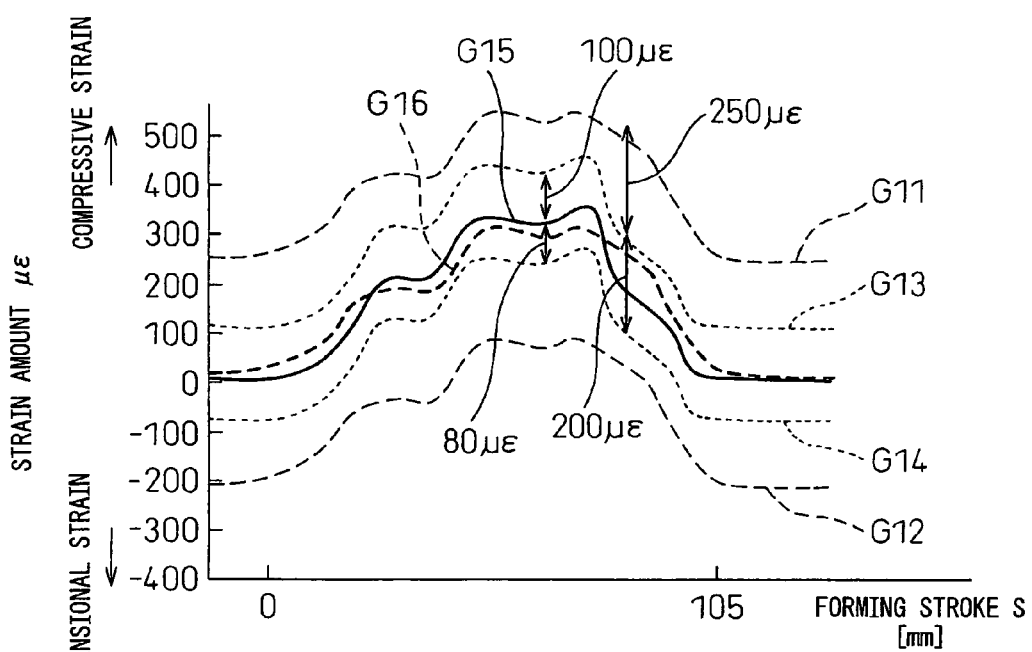
FIG. 16 is a view explaining another method for judging the defect of the product or the mold, according to the press-forming method of the invention.

The strain amount measured by strain measurement means 5 arranged as such were plotted in a graph as shown in FIG. 16. The mold defect and the forming defect were judged by using a predetermined strain amount range (sandwiched by an upper limit G11 and a lower limit G12) for judging the mold defect, and a predetermined strain amount range (sandwiched by an upper limit G13 and a lower limit G14) for judging the forming defect, respectively.

An average strain amount G15 for judging the forming defect and a predetermined strain amount range thereof, and an average strain amount G16 for judging the mold defect and a predetermined strain amount range thereof, as shown in FIG. 16, were determined by the same method as in example 1.

Tables 6 to 9 indicate the test result of the press-forming by using the press-forming device manufactured as example 2.

TABLE 6

| Strain measurement means is positioned in die | | Total Number of Products | Number of Products Having No Defect | Number of Products Having Defect | Items of Defective Products | | | | |
|---|---|---|---|---|---|---|---|---|---|
| | | | | | Crack | Wrinkle | Surface Strain | Springback | Flow-in Amount Defect |
| Inspection Result of Products | | 19471 | 18257 | 1214 | 231 | 14 | 0 | 598 | 371 |
| Judgment by Strain Measurement Means | | 19471 | 18252 | 1219 | | | | | |
| Items of Defect Judgment | Normal Judgment (Inspection Result Coincides with Defect Judgment) | | | 1214 | | | | | |
| | Over-detect | | | 5 | | | | | |
| | Under-detect | | | 0 | | | | | |
| Defect Rate (Number of Products Having Defect/Total Number of Products) | | | 6.23% | | 1.19% | 0.07% | 0.00% | 3.07% | 1.91% |
| Defect judgment Rate (Number of Products in Normal Judgment/Total Number of Products) | | | 6.23% | | | | | | |
| Over-detect Rate (Number of Over-detected Products/Total Number of Products) | | | 0.03% | | | | | | |
| Under-detect Rate (Number of Under-detected Products/Total Number of Products) | | | 0.00% | | | | | | |

The radius curvature of the convex curved portion on the surface R5 of punch 1 was 5 mm, and strain measurement means 5 within the punch was positioned in a region which is not away from center of curvature 7 by 50 mm, as illustrated. The radius curvature of the convex curved portion on the surface R3 of die 2 was 3 mm, and strain measurement means 5 within the die was positioned in a region which is not away from center of curvature 7 by 30 mm, as illustrated.

In order to arrange strain measurement means 5, as shown in FIG. 9a, a non-though bore was formed in the mold and internal threads were formed on the bore, as shown in FIG. 9a.

Table 6 indicates a result of product inspection for detecting a product defect such as a crack or a springback and a result of judgment of the product defect by using the strain amount data obtained by strain measurement means 5 positioned in die 2. Due to strain measurement means 5, the defect judgment rate of 6.23% was obtained, where the defect rate was 6.23%. In other words, all of the product defects were judged. The over-detect rate and under-detect rate were 0.03% and 0.00%, respectively. Therefore, these results were better than the results in example 1.

TABLE 7

| Strain measurement means is positioned in punch | Total Number of Products | Number of Products Having No Defect | Number of Products Having Defect | Items of Defective Products | | | | |
|---|---|---|---|---|---|---|---|---|
| | | | | Crack | Wrinkle | Surface Strain | Springback | Flow-in Amount Defect |
| Inspection Result of Products | 19471 | 18370 | 1101 | 394 | 298 | 384 | 0 | 25 |
| Judgment by Strain Measurement Means | 19471 | 18362 | 1109 | | | | | |
| Items of Defect Judgment — Normal Judgment (Inspection Result Coincides with Defect Judgment) | | | 1101 | | | | | |
| Over-detect | | | 8 | | | | | |
| Under-detect | | | 0 | | | | | |
| Defect Rate (Number of Products Having Defect/Total Number of Products) | | 5.65% | | 2.02% | 1.53% | 1.97% | 0.00% | 0.13% |
| Defect judgment Rate (Number of Products in Normal Judgment/Total Number of Products) | | 5.65% | | | | | | |
| Over-detect Rate (Number of Over-detected Products/Total Number of Products) | | 0.04% | | | | | | |
| Under-detect Rate (Number of Under-detected Products/Total Number of Products) | | 0.00% | | | | | | |

Similarly to the above, table 7 indicates a result of product inspection for detecting a product defect such as a crack or a wrinkle and a result of judgment of the product defect by using the strain amount data obtained by strain measurement means 5 positioned in punch 1. Due to strain measurement means 5, the defect judgment rate of 5.65% was obtained, where the defect rate was 5.65%. In other words, all of the product defects were judged. The over-detect rate and under-detect rate were 0.04% and 0.00%, respectively. Therefore, these results were better than the results in example 1.

TABLE 8

| Strain measurement means is positioned in die | Total Number of Products | Number of Products Having No Defect | Number of Products Having Defect | Items of Defective Molds | | |
|---|---|---|---|---|---|---|
| | | | | Crack of Mold | Sticking | Scratch by Nipped Foreign Matter |
| Inspection Result of Molds | 1523784 | 1523740 | 44 | 3 | 39 | 2 |
| Judgment by Strain Measurement Means | 1523784 | 1523740 | 44 | | | |
| Items of Defect Judgment — Normal Judgment (Inspection Result Coincides with Defect Judgment) | | | 44 | | | |
| Over-detect | | | 0 | | | |
| Under-detect | | | 0 | | | |
| Defect Rate [ppm] (Number of Products Having Defect/Total Number of Products) | | | 28.9 | 2.0 | 25.6 | 1.3 |
| Defect judgment Rate [ppm] (Number of Products in Normal Judgment/Total Number of Products) | | | 28.9 | | | |
| Over-detect Rate [ppm] (Number of Over-detected Products/Total Number of Products) | | | 0.0 | | | |
| Under-detect Rate [ppm] (Number of Under-detected Products/Total Number of Products) | | | 0.0 | | | |

Table 8 indicates a result of mold inspection for detecting a mold defect such as a crack or a sticking and a result of judgment of the mold defect by using the strain amount data obtained by strain measurement means 5 positioned in die 2. Due to strain measurement means 5, the defect judgment rate of 28.9 ppm was obtained, where the defect rate was 28.9 ppm. In other words, all of the mold defects were judged. The over-detect rate and under-detect rate were 0.0 ppm and 0.0 ppm, respectively. Therefore, these results were better than the results in example 1.

TABLE 9

| Strain measurement means is positioned in punch | Total Number of Products | Number of Products Having No Defect | Number of Products Having Defect | Items of Defective Molds | | |
|---|---|---|---|---|---|---|
| | | | | Crack of Mold | Sticking | Scratch by Nipped Foreign Matter |
| Inspection Result of Molds | 1523784 | 1523734 | 50 | 3 | 2 | 45 |
| Judgment by Strain Measurement Means | 1523784 | 1523734 | 50 | | | |
| Items of Defect Judgment  Normal Judgment (Inspection Result Coincides with Defect Judgment) | | | 50 | | | |
| Over-detect | | | 0 | | | |
| Under-detect | | | 0 | | | |
| Defect Rate [ppm] (Number of Products Having Defect/Total Number of Products) | | 32.8 | | 2.0 | 1.3 | 29.5 |
| Defect judgment Rate [ppm] (Number of Products in Normal Judgment/Total Number of Products) | | 32.8 | | | | |
| Over-detect Rate [ppm] (Number of Over-detected Products/Total Number of Products) | | 0.0 | | | | |
| Under-detect Rate [ppm] (Number of Under-detected Products/Total Number of Products) | | 0.0 | | | | |

Table 9 indicates a result of mold inspection for detecting a mold defect such as a crack or a sticking and a result of judgment of the mold defect by using the strain amount data obtained by strain measurement means 5 positioned in punch 1. Due to strain measurement means 5, the defect judgment rate of 32.8 ppm was obtained, where the defect rate was 32.8 ppm. In other words, all of the mold defects were judged. The over-detect rate and under-detect rate were 0.0 ppm and 0.0 ppm, respectively. Therefore, these results were better than the results in example 1.

Due to the above results, it is understood that judgment of defect of the product or the mold was achieved more precisely, according to the invention. In other words, by positioning strain measurement means 5 in the mold, within the region defined by the distance ten times R from center of curvature 7 of the curved portion, the judgment accuracy of the product defect or the mold product may be improved in comparison to example 1.

Example 3

Based on the present invention, the press-forming device as, shown in FIG. 7 was manufactured to carry out press-forming, as an example 3. The characteristic of a steel sheet used as a workpiece is indicated in table 10. The thickness and the tensile strength of the used steel sheet were 0.8 mm and 270 MPa, respectively.

TABLE 10

| Material | Yield stress [MPa] | Tensile strength [MPa] | Elongation [%] |
|---|---|---|---|
| Steel Sheet | 129 | 308 | 52 |

Figure 17:
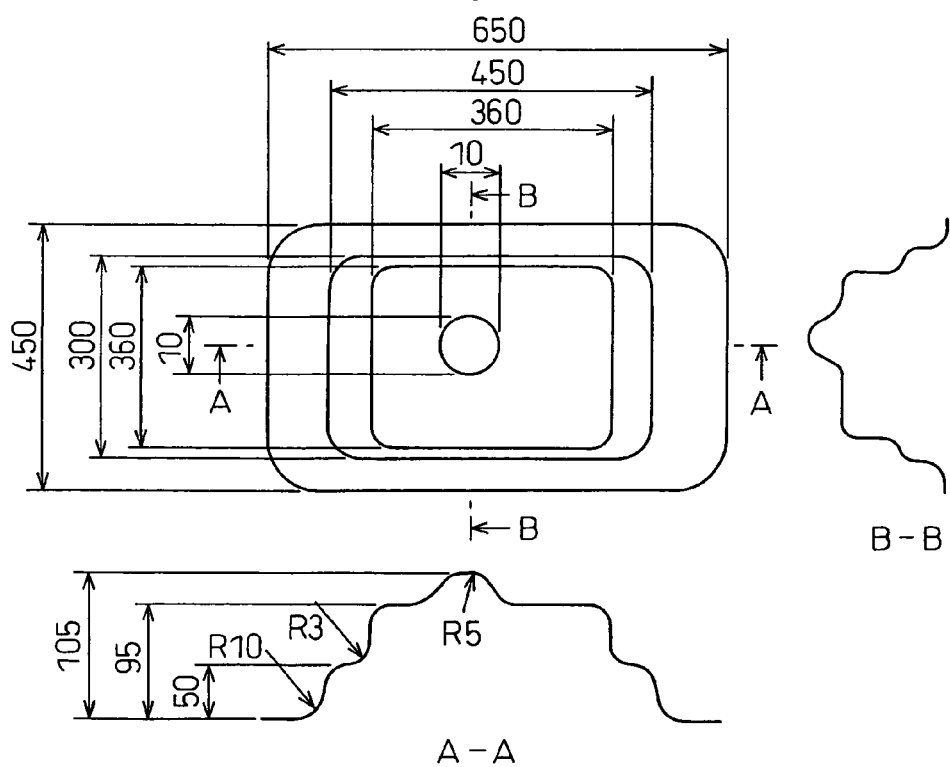
FIG. 17 is an external view of another product formed by the press-forming device of the invention.

The shape of the member formed by the press-forming device is shown in FIG. 17. As indicated by a cross section A-A in FIG. 17, the member has a vertical die wall having a characteristic portion with R3, and a punch bottom having a characteristic portion with R5.

Figure 18:
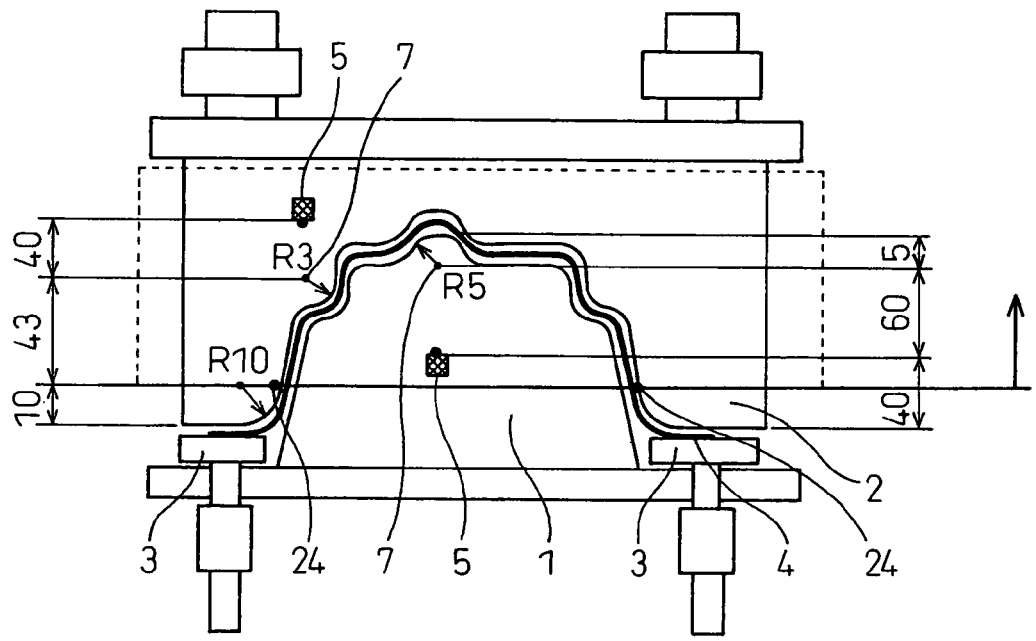
FIG. 18 is a view indicating another installation position of the strain measurement means.

In the press-forming, both the punch and the die were selected as the mold to be measured and, as shown in FIG. 18, two strain measurement means 5 were arranged, i.e., one in punch 1 and the other in die 2.

Each of the two strain measurement means was positioned at the press-direction side relative to the radius end of the die shoulder on the material flow-out side when the punch and the tie were positioned at a lower dead point of press-forming. The press-direction is indicated by an arrow in the drawing.

The radius curvature of the convex curved portion on the surface R5 of punch 1 was 5 mm, and strain measurement means 5 within the punch was positioned away from center of curvature 7 by −60 mm in the press-direction. In other words, strain measurement means 5 was positioned outside the region defined by the distance ten times R from center of curvature 7.

The radius curvature of the convex curved portion on the surface R3 of die 2 was 3 mm, and strain measurement means 5 within the die was positioned away from center of curvature 7 by +40 mm in the press-direction. In other words, strain measurement means 5 was positioned outside the region defined by the distance ten times R from center of curvature 7.

In order to arrange strain measurement means 5, as shown in FIG. 9a, a non-though bore was formed in the mold and internal threads were formed on the bore, as shown in FIG. 9a.

Further, a strain sensor 8 as shown in FIG. 9 was inserted into the bore and then a plug was inserted so as to apply an axial force for press-fitting.

As strain sensor 8, a piezoelectric element sensor was used. The direction of compressive or extensional strain measured by the sensor was the same as the press-direction.

Figure 19:
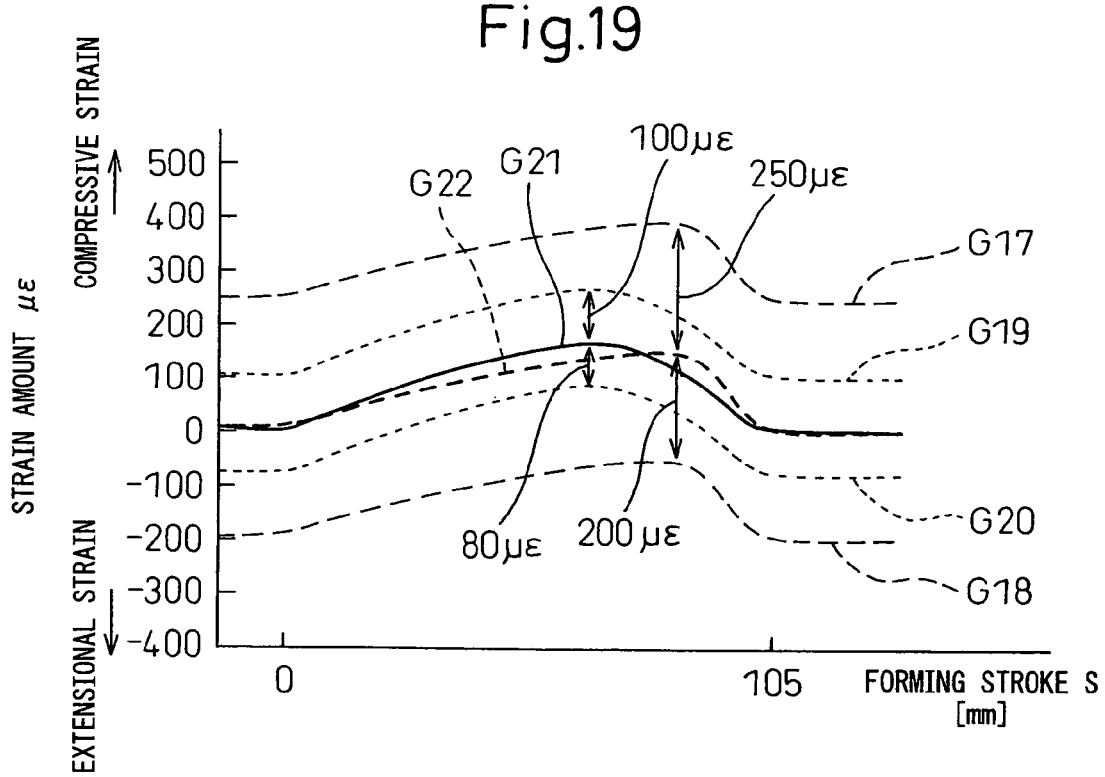
FIG. 19 is a view explaining another method for judging the defect of the product or the mold, according to the press-forming method of the invention.

The strain amount measured by strain measurement means 5 arranged as such were plotted in a graph as shown in FIG. 19. The mold defect and the forming defect were judged by using a predetermined strain amount range (sandwiched by an upper limit G17 and a lower limit G18) for judging the mold defect, and a predetermined strain amount range (sandwiched by an upper limit G19 and a lower limit G20) for judging the forming defect, respectively.

An average strain amount G21 for judging the forming defect and a predetermined strain amount range thereof, and an average strain amount G22 for judging the mold defect and a predetermined strain amount range thereof, as shown in FIG. 19, were determined by the same method as in example 1.

Tables 11 to 14 indicate the test result of the press-forming by using the press-forming device manufactured as example 3.

TABLE 11

| Strain measurement means is positioned in die | Total Number of Products | Number of Products Having No Defect | Number of Products Having Defect | Items of Defective Products | | | | |
|---|---|---|---|---|---|---|---|---|
| | | | | Crack | Wrinkle | Surface Strain | Spring back | Flow-in Amount Defect |
| Inspection Result of Products | 22780 | 21589 | 1191 | 574 | 12 | 0 | 280 | 325 |
| Judgment by Strain Measurement Means | 22780 | 21511 | 1269 | | | | | |
| Items of Defect Judgment — Normal Judgment (Inspection Result Coincides with Defect Judgment) | | | 1181 | | | | | |
| Over-detect | | | 88 | | | | | |
| Under-detect | | | 10 | | | | | |
| Defect Rate (Number of Products Having Defect/Total Number of Products) | | 5.23% | | 2.52% | 0.05% | 0.00% | 1.23% | 1.43% |
| Defect judgment Rate (Number of Products in Normal Judgment/Total Number of Products) | | 5.18% | | | | | | |
| Over-detect Rate (Number of Over-detected Products/Total Number of Products) | | 0.39% | | | | | | |
| Under-detect Rate (Number of Under-detected Products/Total Number of Products) | | 0.04% | | | | | | |

Table 11 indicates a result of product inspection for detecting a product defect such as a crack or a springback and a result of judgment of the product defect by using the strain amount data obtained by strain measurement means 5 positioned in die 2. Due to strain measurement means 5, the defect judgment rate of 5.18% was obtained, where the defect rate was 5.23%. The over-detect rate and under-detect rate were 0.39% and 0.04%, respectively.

TABLE 12

| Strain measurement means is positioned in punch | Total Number of Products | Number of Products Having No Defect | Number of Products Having Defect | Items of Defective Products | | | | |
|---|---|---|---|---|---|---|---|---|
| | | | | Crack | Wrinkle | Surface Strain | Spring back | Flow-in Amount Defect |
| Inspection Result of Products | 22780 | 21697 | 1083 | 365 | 287 | 412 | 0 | 19 |
| Judgment by Strain Measurement Means | 22780 | 21606 | 1174 | | | | | |
| Items of Defect Judgment — Normal Judgment (Inspection Result Coincides with Defect Judgment) | | | 1074 | | | | | |
| Over-detect | | | 100 | | | | | |
| Under-detect | | | 9 | | | | | |

TABLE 12-continued

| Strain measurement means is positioned in punch | Total Number of Products | Number of Products Having No Defect | Number of Products Having Defect | Items of Defective Products | | | | |
|---|---|---|---|---|---|---|---|---|
| | | | | Crack | Wrinkle | Surface Strain | Spring back | Flow-in Amount Defect |
| Defect Rate (Number of Products Having Defect/Total Number of Products) | | 4.75% | | 1.60% | 1.26% | 1.81% | 0.00% | 0.08% |
| Defect judgment Rate (Number of Products in Normal Judgment/Total Number of Products) | | 4.71% | | | | | | |
| Over-detect Rate (Number of Over-detected Products/Total Number of Products) | | 0.44% | | | | | | |
| Under-detect Rate (Number of Under-detected Products/Total Number of Products) | | 0.04% | | | | | | |

Similar to the above, table 12 indicates a result of product inspection for detecting a product defect such as a crack or a wrinkle and a result of judgment of the product defect by using the strain amount data obtained by strain measurement means 5 positioned in punch 1. Due to strain measurement means 5, the defect judgment rate of 4.71% was obtained, where the defect rate was 4.75%. The over-detect rate and under-detect rate were 0.44% and 0.04%, respectively.

Table 13 indicates a result of mold inspection for detecting a mold defect such as a crack or a sticking and a result of judgment of the mold defect by using the strain amount data obtained by strain measurement means 5 positioned in die 2. Due to strain measurement means 5, the defect judgment rate of 13.3 ppm was obtained, where the defect rate was 16.1 ppm. The over-detect rate and under-detect rate were 10.9 ppm and 2.8 ppm, respectively.

TABLE 13

| Strain measurement means is positioned in die | | Total Number of Products | Number of Products Having No Defect | Number of Products Having Defect | Items of Defective Molds | | |
|---|---|---|---|---|---|---|---|
| | | | | | Crack of Mold | Sticking | Scratch by Nipped Foreign Matter |
| Inspection Result of Molds | | 2110077 | 2110043 | 34 | 1 | 14 | 19 |
| Judgment by Strain Measurement Means | | 2110077 | 2110026 | 51 | | | |
| Items of Defect Judgment | Normal Judgment (Inspection Result Coincides with Defect Judgment) | | | 28 | | | |
| | Over-detect | | | 23 | | | |
| | Under-detect | | | 6 | | | |
| Defect Rate [ppm] (Number of Products Having Defect/Total Number of Products) | | | 16.1 | | 0.5 | 6.6 | 9.0 |
| Defect judgment Rate [ppm] (Number of Products in Normal Judgment/Total Number of Products) | | | 13.3 | | | | |
| Over-detect Rate [ppm] (Number of Over-detected Products/Total Number of Products) | | | 10.9 | | | | |
| Under-detect Rate [ppm] (Number of Under-detected Products/Total Number of Products) | | | 2.8 | | | | |

TABLE 14

| Strain measurement means is positioned in punch | | Total Number of Products | Products Having No Defect | Products Having Defect | Crack of Mold | Sticking | Scratch by Nipped Foreign Matter |
|---|---|---|---|---|---|---|---|
| Inspection Result of Molds | | 2110077 | 2109997 | 80 | 1 | 1 | 78 |
| Judgment by Strain Measurement Means | | 2110077 | 2109982 | 95 | | | |
| Items of Defect Judgment | Normal Judgment (Inspection Result Coincides with Defect Judgment) | | | 69 | | | |
| | Over-detect | | | 26 | | | |
| | Under-detect | | | 11 | | | |
| Defect Rate [ppm] (Number of Products Having Defect/Total Number of Products) | | | 37.9 | | 0.5 | 0.5 | 37.0 |
| Defect judgment Rate [ppm] (Number of Products in Normal Judgment/Total Number of Products) | | | 32.7 | | | | |
| Over-detect Rate [ppm] (Number of Over-detected Products/Total Number of Products) | | | 12.3 | | | | |
| Under-detect Rate [ppm] (Number of Under-detected Products/Total Number of Products) | | | 5.2 | | | | |

Table 14 indicates a result of mold inspection for detecting a mold defect such as a crack or a sticking and a result of judgment of the mold defect by using the strain amount data obtained by strain measurement means 5 positioned in punch 1. Due to strain measurement means 5, the defect judgment rate of 32.7 ppm was obtained, where the defect rate was 37.9 ppm. The over-detect rate and under-detect rate were 12.3 ppm and 5.2 ppm, respectively.

Due to the above results, it is understood that judgment of defect of the product or the mold was achieved according to the invention.

Example 4

Based on the present invention, the press-forming device as shown in FIG. 7 was manufactured to carry out press-forming, as an example 4. The characteristic of a steel sheet used as a workpiece is indicated in table 10. The shape of the member formed by the press-forming device is shown in FIG. 17.

Figure 20:
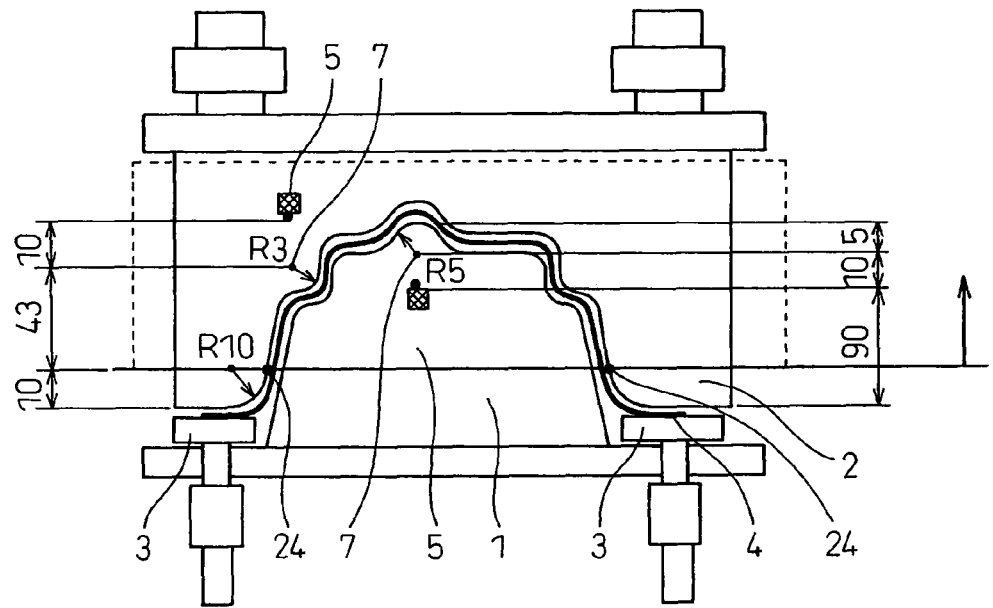
FIG. 20 is a view indicating another installation position of the strain measurement means.

In the press-forming, both the punch and the die were selected as the mold to be measured and, as shown in FIG. 20, two strain measurement means 5 were arranged, i.e., one in punch 1 and the other in die 2. Each of the two strain measurement means was positioned at the press-direction side relative to the radius end of the die shoulder on the material flow-out side when the punch and the tie were positioned at a lower dead point of press-forming. The press-direction is indicated by an arrow in the drawing.

The radius curvature of the convex curved portion on the surface R5 of punch 1 was 5 mm, and strain measurement means 5 within the punch was positioned in a region which is not away from center of curvature 7 by 50 mm, as illustrated.

The radius curvature of the convex curved portion on the surface R3 of die 2 was 3 mm, and strain measurement means 5 within the die was positioned in a region which is not away from center of curvature 7 by 30 mm, as illustrated.

In order to arrange strain measurement means 5, as shown in FIG. 9a, a non-though bore was formed in the mold and internal threads were formed on the bore, as shown in FIG. 9a. Further, a strain sensor 8 as shown in FIG. 9 was inserted into the bore and then a plug was inserted so as to apply an axial force for press-fitting.

As strain sensor 8, a piezoelectric element sensor was used. The direction of compressive or extensional strain measured by the sensor was the same as the press-direction.

Figure 21:
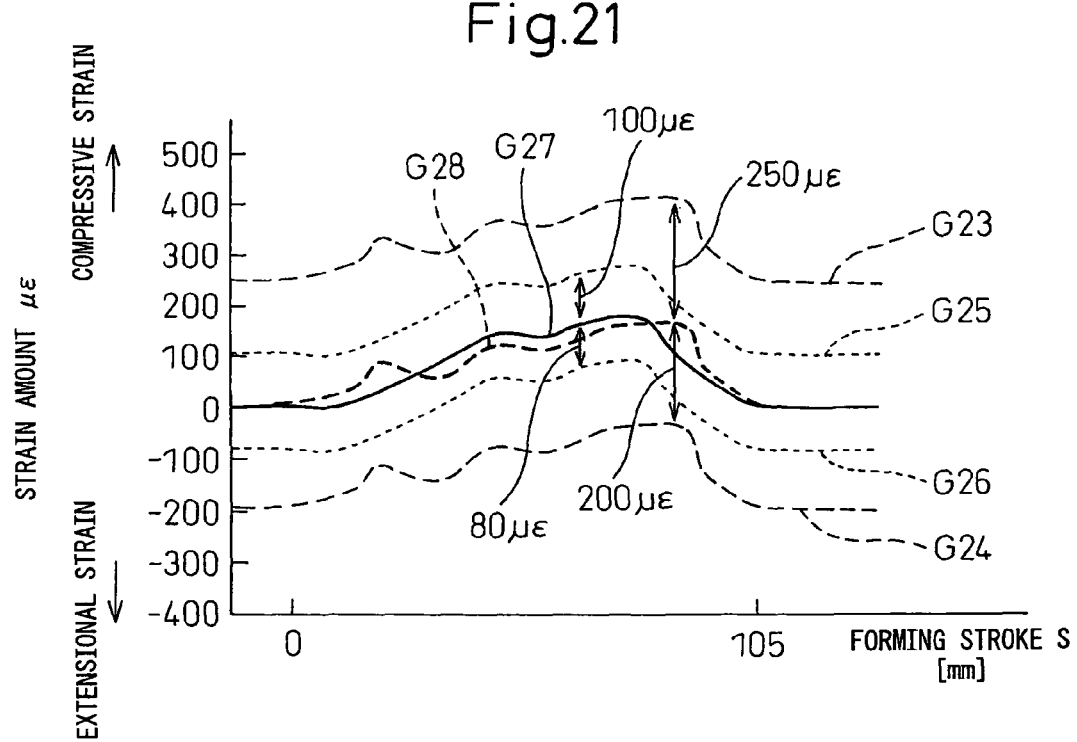
FIG. 21 is a view explaining another method for judging the defect of the product or the mold, according to the press-forming method of the invention.

The strain amount measured by strain measurement means 5 arranged as such are plotted in a graph as shown in FIG. 21. The mold defect and the forming defect were judged by using a predetermined strain amount range (sandwiched by an upper limit G23 and a lower limit G24) for judging the mold defect, and a predetermined strain amount range (sandwiched by an upper limit G25 and a lower limit G26) for judging the forming defect, respectively.

An average strain amount G27 for judging the forming defect and a predetermined strain amount range thereof, and an average strain amount G28 for judging the mold defect and a predetermined strain amount range thereof, as shown in FIG. 21, were determined by the same method as in example 1.

Tables 15 to 18 indicate the test result of the press-forming by using the press-forming device manufactured as example 4.

TABLE 15

| Strain measurement means is positioned in die | Total Number of Products | Number of Products Having No Defect | Number of Products Having Defect | Crack | Wrinkle | Surface Strain | Springback | Flow-in Amount Defect |
|---|---|---|---|---|---|---|---|---|
| | | | | | | Items of Defective Products | | |
| Inspection Result of Products | 22780 | 21589 | 1191 | 574 | 12 | 0 | 280 | 325 |
| Judgment by Strain Measurement Means | 22780 | 21580 | 1200 | | | | | |
| Items of Defect Judgment — Normal Judgment (Inspection Result Coincides with Defect Judgment) | | | 1191 | | | | | |
| Over-detect | | | 9 | | | | | |
| Under-detect | | | 0 | | | | | |
| Defect Rate (Number of Products Having Defect/Total Number of Products) | | 5.23% | | 2.52% | 0.05% | 0.00% | 1.23% | 1.43% |
| Defect judgment Rate (Number of Products in Normal Judgment/Total Number of Products) | | 5.23% | | | | | | |
| Over-detect Rate (Number of Over-detected Products/Total Number of Products) | | 0.04% | | | | | | |
| Under-detect Rate (Number of Under-detected Products/Total Number of Products) | | 0.00% | | | | | | |

Table 15 indicates a result of product inspection for detecting a product defect such as a crack or a springback and a result of judgment of the product defect by using the strain amount data obtained by strain measurement means 5 positioned in die 2. Due to strain measurement means 5, the defect judgment rate of 5.23% was obtained, where the defect rate was 5.23%. In other words, all of the product defects were judged. The over-detect rate and under-detect rate were 0.04% and 0.00%, respectively. Therefore, these results were better than the results in example 3.

TABLE 16

| Strain measurement means is positioned in punch | Total Number of Products | Number of Products Having No Defect | Number of Products Having Defect | Crack | Wrinkle | Surface Strain | Springback | Flow-in Amount Defect |
|---|---|---|---|---|---|---|---|---|
| | | | | | | Items of Defective Products | | |
| Inspection Result of Products | 22780 | 21697 | 1083 | 365 | 287 | 412 | 0 | 19 |
| Judgment by Strain Measurement Means | 22780 | 21684 | 1096 | | | | | |
| Items of Defect Judgment — Normal Judgment (Inspection Result Coincides with Defect Judgment) | | | 1083 | | | | | |
| Over-detect | | | 13 | | | | | |
| Under-detect | | | 0 | | | | | |
| Defect Rate (Number of Products Having Defect/Total Number of Products) | | 4.75% | | 1.60% | 1.26% | 1.81% | 0.00% | 0.08% |
| Defect judgment Rate (Number of Products in Normal Judgment/Total Number of Products) | | 4.75% | | | | | | |
| Over-detect Rate (Number of Over-detected Products/Total Number of Products) | | 0.06% | | | | | | |
| Under-detect Rate (Number of Under-detected Products/Total Number of Products) | | 0.00% | | | | | | |

Similarly to the above, table 16 indicates a result of product inspection for detecting a product defect such as a crack or a wrinkle and a result of judgment of the product defect by using the strain amount data obtained by strain measurement means 5 positioned in punch 1. Due to strain measurement means 5, the defect judgment rate of 4.75% was obtained, where the defect rate was 4.75%. In other words, all of the product defects were judged. The over-detect rate and under-detect rate were 0.06% and 0.00%, respectively. Therefore, these results were better than the results in example 3.

TABLE 17

| Strain measurement means is positioned in die | | Total Number of Products | Number of Products Having No Defect | Number of Products Having Defect | Items of Defective Molds | | |
|---|---|---|---|---|---|---|---|
| | | | | | Crack of Mold | Sticking | Scratch by Nipped Foreign Matter |
| Inspection Result of Molds | | 2110077 | 2110043 | 34 | 1 | 14 | 19 |
| Judgment by Strain Measurement Means | | 2110077 | 2110042 | 35 | | | |
| Items of Defect Judgment | Normal Judgment (Inspection Result Coincides with Defect Judgment) | | | 34 | | | |
| | Over-detect | | | | 1 | | |
| | Under-detect | | | | 0 | | |
| Defect Rate [ppm] (Number of Products Having Defect/Total Number of Products) | | | 16.1 | | 0.5 | 6.6 | 9.0 |
| Defect judgment Rate [ppm] (Number of Products in Normal Judgment/Total Number of Products) | | | 16.1 | | | | |
| Over-detect Rate [ppm] (Number of Over-detected Products/Total Number of Products) | | | 0.5 | | | | |
| Under-detect Rate [ppm] (Number of Under-detected Products/Total Number of Products) | | | 0.0 | | | | |

Table 8 indicates a result of mold inspection for detecting a mold defect such as a crack or a sticking and a result of judgment of the mold defect by using the strain amount data obtained by strain measurement means 5 positioned in die 2. Due to strain measurement means 5, the defect judgment rate of 16.1 ppm was obtained, where the defect rate was 16.1 ppm. The over-detect rate and under-detect rate were 0.5 ppm and 0.0 ppm, respectively. Therefore, these results were better than the results in example 3.

TABLE 18

| Strain measurement means is positioned in punch | | Total Number of Products | Number of Products Having No Defect | Number of Products Having Defect | Items of Defective Molds | | |
|---|---|---|---|---|---|---|---|
| | | | | | Crack of Mold | Sticking | Scratch by Nipped Foreign Matter |
| Inspection Result of Molds | | 2110077 | 2109997 | 80 | 1 | 1 | 78 |
| Judgment by Strain Measurement Means | | 2110077 | 2109997 | 80 | | | |
| Items of Defect Judgment | Normal Judgment (Inspection Result Coincides with Defect Judgment) | | | 80 | | | |
| | Over-detect | | | | 0 | | |
| | Under-detect | | | | 0 | | |
| Defect Rate [ppm] (Number of Products Having Defect/Total Number of Products) | | | 37.9 | | 0.5 | 0.5 | 37.0 |
| Defect judgment Rate [ppm] (Number of Products in Normal Judgment/Total Number of Products) | | | 37.9 | | | | |

TABLE 18-continued

| Strain measurement means is positioned in punch | Total Number of Products | Number of Products Having No Defect | Number of Products Having Defect | Items of Defective Molds | | |
|---|---|---|---|---|---|---|
| | | | | Crack of Mold | Sticking | Scratch by Nipped Foreign Matter |
| Over-detect Rate [ppm] (Number of Over-detected Products/Total Number of Products) | | 0.0 | | | | |
| Under-detect Rate [ppm] (Number of Under-detected Products/Total Number of Products) | | 0.0 | | | | |

Table 18 indicates a result of mold inspection for detecting a mold defect such as a crack or a sticking and a result of judgment of the mold defect by using the strain amount data obtained by strain measurement means 5 positioned in punch 1. Due to strain measurement means 5, the defect judgment rate of 32.8 ppm was obtained, where the defect rate was 32.8 ppm. In other words, all of the mold defects were judged. The over-detect rate and under-detect rate were 0.0 ppm and 0.0 ppm, respectively. Therefore, these results were better than the results in example 3.

Due to the above results, it could be understood that judgment of defect of the product or the mold was achieved more precisely, according to the invention. In other words, by positioning strain measurement means 5 in the mold, within the region defined by the distance ten times R from center of curvature 7 of the curved portion, the judgment accuracy of the product defect or the mold product may be improved in comparison to example 3.

While the invention has been described with reference to specific embodiments chosen for the purpose of illustration, it should be apparent that numerous modifications could be made thereto, by one skilled in the art, without departing from the basic concept and scope of the invention.

DESCRIPTION OF REFERENCE NUMERALS

| | |
|---|---|
| 1 | Punch |
| 2 | Die |
| 3 | Blank-holding die |
| 4 | Workpiece |
| 5 | Strain measurement means |
| 6 | Strain measurement means installation region |
| 7 | Center of curvature |
| 8 | Strain sensor |

The invention claimed is:

1. A press-forming device comprising:
a punch;
a mold, configured to move relative to the punch, and form a product having at least one curved surface from a workpiece placed between the punch and the mold; and
a strain sensor, arranged in the mold, the strain sensor configured for measuring strain on the mold generated by press-forming the workpiece, wherein
the strain sensor is positioned at a press-direction side relative to a radius end of a die shoulder on a material flow-out side when the mold is positioned at a lower dead point of press-forming,
wherein a measurement point of the strain sensor is positioned within a region between surfaces which (i) intersect respective end portions of the curved surface of the mold, and (ii) are inclined away from the curved surface by 45 degrees relative to normal lines at the respective end portions if the curved surface of the mold is convex, or are inclined towards the curved surface by 45 degrees relative to normal lines at the respective end portions if the curved surface of the mold is concave, and
wherein the strain sensor extends in the direction perpendicular to the press direction, and the strain sensor is configured to detect a friction force between the workpiece and the mold.

2. The press-forming device according to claim 1, wherein the measurement point of the strain sensor is positioned within a region defined by a surface away from a center of curvature of a curved surface of the mold at a distance ten times R, wherein R is a curvature radius of the curved surface.

3. The press-forming device according to claim 1, wherein the measurement point of the strain sensor is positioned away from a surface of the mold by at least 5 millimeters.

4. The press-forming device according to claim 1, further comprising a blank holding die configured to apply a blank-holding force to a workpiece to be processed.

5. The press forming device according to claim 1, wherein the strain sensor is a piezoelectric element sensor.

6. The press-forming device according to claim 1, wherein the curved surface of the mold is convex; and
wherein the measurement point of the strain sensor is positioned within a region between surfaces which (i) intersect respective end portions of the curved surface of the mold, and (ii) are inclined away from the curved surface by 45 degrees relative to normal lines at the respective end portions.

7. The press-forming device according to claim 1, wherein the curved surface of the mold is concave; and
wherein the measurement point of the strain sensor is positioned within a region between surfaces which (i) intersect respective end portions of the curved surface of the mold, and (ii) are inclined towards the curved surface by 45 degrees relative to normal lines at the respective end portions.

* * * * *

UNITED STATES PATENT AND TRADEMARK OFFICE
CERTIFICATE OF CORRECTION

PATENT NO. : 8,584,496 B2  
APPLICATION NO. : 12/451324  
DATED : November 19, 2013  
INVENTOR(S) : Takuya Kuwayama et al.

Page 1 of 1

It is certified that error appears in the above-identified patent and that said Letters Patent is hereby corrected as shown below:

In the Specification

Column 7, line 48, change "$\epsilon_m$" to -- $\varepsilon_m$ --;

Column 7, line 50, change "$\epsilon_m$" to -- $\varepsilon_m$ --;

Column 7, line 53, change "$\sigma_m = E \cdot \epsilon_m$" to -- $\sigma_m = E \cdot \varepsilon_m$ --;

Column 8, line 4, change "strain Measurement" to -- strain measurement --;

Column 9, line 30, change "$\epsilon m=10\mu\epsilon$" to -- $\varepsilon m=10\mu\varepsilon$ --;

Column 9, line 37, change "Y=840MPa)" to -- Y=840MPa --;

Column 9, line 41, change "Y=340MPa)" to -- Y=340MPa --;

Column 14, line 35, change "$100\mu\epsilon$" to -- $100\mu\varepsilon$ --;

Column 14, line 43, change "$80\mu\epsilon$" to -- $80\mu\varepsilon$ --;

Column 14, line 56, change "$250\mu\epsilon$" to -- $250\mu\varepsilon$ --;

Column 14, line 64, change "$200\mu\epsilon$" to -- $200\mu\varepsilon$ --.

Signed and Sealed this  
Fifth Day of August, 2014

Michelle K. Lee  
*Deputy Director of the United States Patent and Trademark Office*

UNITED STATES PATENT AND TRADEMARK OFFICE
CERTIFICATE OF CORRECTION

PATENT NO.        : 8,584,496 B2                                    Page 1 of 1
APPLICATION NO.   : 12/451324
DATED             : November 19, 2013
INVENTOR(S)       : Kuwayama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this
Twenty-second Day of September, 2015

Michelle K. Lee
*Director of the United States Patent and Trademark Office*